United States Patent
Ohara et al.

(10) Patent No.: US 8,149,298 B2
(45) Date of Patent: Apr. 3, 2012

(54) IMAGING DEVICE AND METHOD

(75) Inventors: Naoto Ohara, Tokyo (JP); Yusuke Hayashi, Tokyo (JP); Tomoya Sugita, Tokyo (JP)

(73) Assignee: KYOCERA Corporation, Kyoto (JP)

( * ) Notice: Subject to any disclaimer, the term of this patent is extended or adjusted under 35 U.S.C. 154(b) by 366 days.

(21) Appl. No.: 12/491,437

(22) Filed: Jun. 25, 2009

(65) Prior Publication Data

US 2009/0322898 A1 Dec. 31, 2009

(30) Foreign Application Priority Data

Jun. 27, 2008 (JP) ................................. 2008-169105

(51) Int. Cl.
*H04N 5/262* (2006.01)
*G02B 15/14* (2006.01)

(52) U.S. Cl. ................................. 348/240.99; 359/676

(58) Field of Classification Search ............. 348/240.99, 348/240.3; 359/227, 228, 676, 726
See application file for complete search history.

(56) References Cited

U.S. PATENT DOCUMENTS

| | | | |
|---|---|---|---|
| 3,739,089 A | 6/1973 | Latall | |
| 5,664,243 A | 9/1997 | Okada et al. | |
| 5,748,371 A | 5/1998 | Cathey, Jr. et al. | |
| 6,021,005 A | 2/2000 | Cathey, Jr. et al. | |
| 6,069,738 A | 5/2000 | Cathey, Jr. et al. | |
| 6,148,528 A | 11/2000 | Jackson | |
| 6,233,060 B1 | 5/2001 | Shu et al. | |
| 6,241,656 B1 | 6/2001 | Suga | |
| 6,449,087 B2 | 9/2002 | Ogino | |
| 6,525,302 B2 | 2/2003 | Dowski, Jr. et al. | |
| 6,606,669 B1 | 8/2003 | Nakagiri | |
| 6,642,504 B2 | 11/2003 | Cathey, Jr. | |
| 6,984,206 B2 | 1/2006 | Kumei et al. | |
| 7,088,520 B2* | 8/2006 | Nishioka | 359/676 |
| 7,158,660 B2 | 1/2007 | Gee et al. | |
| 7,400,393 B2 | 7/2008 | Shibata et al. | |
| 7,583,301 B2 | 9/2009 | Sakurai et al. | |
| 7,630,584 B2 | 12/2009 | Nose et al. | |
| 7,719,772 B2 | 5/2010 | Mann et al. | |

(Continued)

FOREIGN PATENT DOCUMENTS

JP 63-229851 9/1988

(Continued)

OTHER PUBLICATIONS

Office Action dated Mar. 10, 2010 issued for U.S. Appl. No. 11/773,792.

(Continued)

*Primary Examiner* — Kelly L Jerabek
(74) *Attorney, Agent, or Firm* — Procopio, Cory, Hargreaves & Savitch LLP

(57) ABSTRACT

An image processing method and apparatus operable for processing images is disclosed. The image processing method allows for drawing any given image in an output image on which various types of image processing have been performed. Such various types of image processing are, for example, correction of an image having distortion due to the distortion aberration of an imaging lens, an image having unnatural perspective distortion of a subject due to high-angle or overhead photography, generation of an output image with the viewpoint changed from the viewpoint of a captured image, mirror-image conversion of a captured image, and electronic zooming. Embodiments of the present invention also relate to an imaging apparatus that uses the image processing method.

17 Claims, 22 Drawing Sheets

U.S. PATENT DOCUMENTS

| | | |
|---|---|---|
| 2002/0118457 A1 | 8/2002 | Dowski |
| 2002/0181126 A1* | 12/2002 | Nishioka ................. 359/726 |
| 2003/0076514 A1 | 4/2003 | Gallagher et al. |
| 2003/0122926 A1 | 7/2003 | Kumei et al. |
| 2003/0158503 A1 | 8/2003 | Matsumoto |
| 2004/0136605 A1 | 7/2004 | Seger et al. |
| 2004/0179280 A1* | 9/2004 | Nishioka ................. 359/846 |
| 2004/0190762 A1 | 9/2004 | Dowski et al. |
| 2004/0257677 A1 | 12/2004 | Matsusaka |
| 2005/0128342 A1 | 6/2005 | Izukawa |
| 2005/0157409 A1* | 7/2005 | Nishioka ................. 359/726 |
| 2006/0012385 A1 | 1/2006 | Tsao et al. |
| 2007/0086674 A1 | 4/2007 | Guan |
| 2007/0268376 A1 | 11/2007 | Yoshikawa et al. |
| 2007/0279539 A1* | 12/2007 | Suzuki et al. ................. 349/1 |
| 2007/0291152 A1 | 12/2007 | Suekane et al. |
| 2008/0007797 A1 | 1/2008 | Hayashi |
| 2008/0043126 A1 | 2/2008 | Hayashi |
| 2008/0074507 A1 | 3/2008 | Ohara et al. |
| 2008/0081996 A1 | 4/2008 | Grenon et al. |
| 2008/0259275 A1 | 10/2008 | Aoki et al. |
| 2008/0278592 A1 | 11/2008 | Kuno et al. |

FOREIGN PATENT DOCUMENTS

| | | |
|---|---|---|
| JP | H03-010380 A | 1/1991 |
| JP | 03-175403 | 7/1991 |
| JP | H06-130267 A | 5/1994 |
| JP | H08-128923 A | 5/1996 |
| JP | H10-145667 A | 5/1998 |
| JP | H11-261868 A | 9/1999 |
| JP | 2000-050146 A | 2/2000 |
| JP | 2000-098301 A | 7/2000 |
| JP | 2000-266979 A | 9/2000 |
| JP | 2000-275582 A | 10/2000 |
| JP | 2001-257930 A | 9/2001 |
| JP | 2001-346069 A | 12/2001 |
| JP | 2002-027047 A | 1/2002 |
| JP | 2002-127852 A | 5/2002 |
| JP | 2002-221657 A | 9/2002 |
| JP | 2003-185905 A | 7/2003 |
| JP | 2003-235794 | 8/2003 |
| JP | 2003-244530 A | 8/2003 |
| JP | 2003-248171 A | 9/2003 |
| JP | 2003-262778 A | 9/2003 |
| JP | 2003-283878 A | 10/2003 |
| JP | 2004-037733 A | 2/2004 |
| JP | 2004-147188 A | 5/2004 |
| JP | 2004-153497 A | 5/2004 |
| JP | 2004-264577 A | 9/2004 |
| JP | 2004-328506 A | 11/2004 |
| JP | 2005-326684 A | 11/2005 |
| JP | 2006-139246 A | 1/2006 |
| JP | 2006-049949 A | 2/2006 |
| JP | 2006-094112 A | 4/2006 |
| JP | 2006-154767 A | 6/2006 |
| JP | 2006-308987 A | 11/2006 |
| JP | 2007-060647 A | 3/2007 |
| JP | 2007-300208 A | 11/2007 |
| JP | 2008-017157 A | 1/2008 |
| JP | 2008-035282 | 2/2008 |
| WO | 2006/022373 A1 | 3/2006 |
| WO | 2007/013621 A1 | 2/2007 |
| WO | 2007/074679 A1 | 7/2007 |

OTHER PUBLICATIONS

Final Office Action dated Aug. 18, 2010 issued for U.S. Appl. No. 11/773,792.

Office Action dated Jun. 10, 2010 issued for U.S. Appl. No. 11/861,217.

International Search Report dated May 12, 2009 issued by the Japanese Patent Office for International Application No. PCT/JP2009/056376.

Office Action dated Jan. 19, 2011 issued by the Japanese Patent Office for Japanese Application No. JP 2006-259646.

Dowski, Edward R. Jr., et al., "Extended Depth of Field through Wave-Front Coding", Appl. Opt. vol. 34, p. 1859-1866 (1995).

* cited by examiner

JAN

CODE49

QR CODE

STATE OF LIGHT BEAM IN OPTICAL SYSTEM

SPOT IMAGES OF OPTICAL SYSTEM

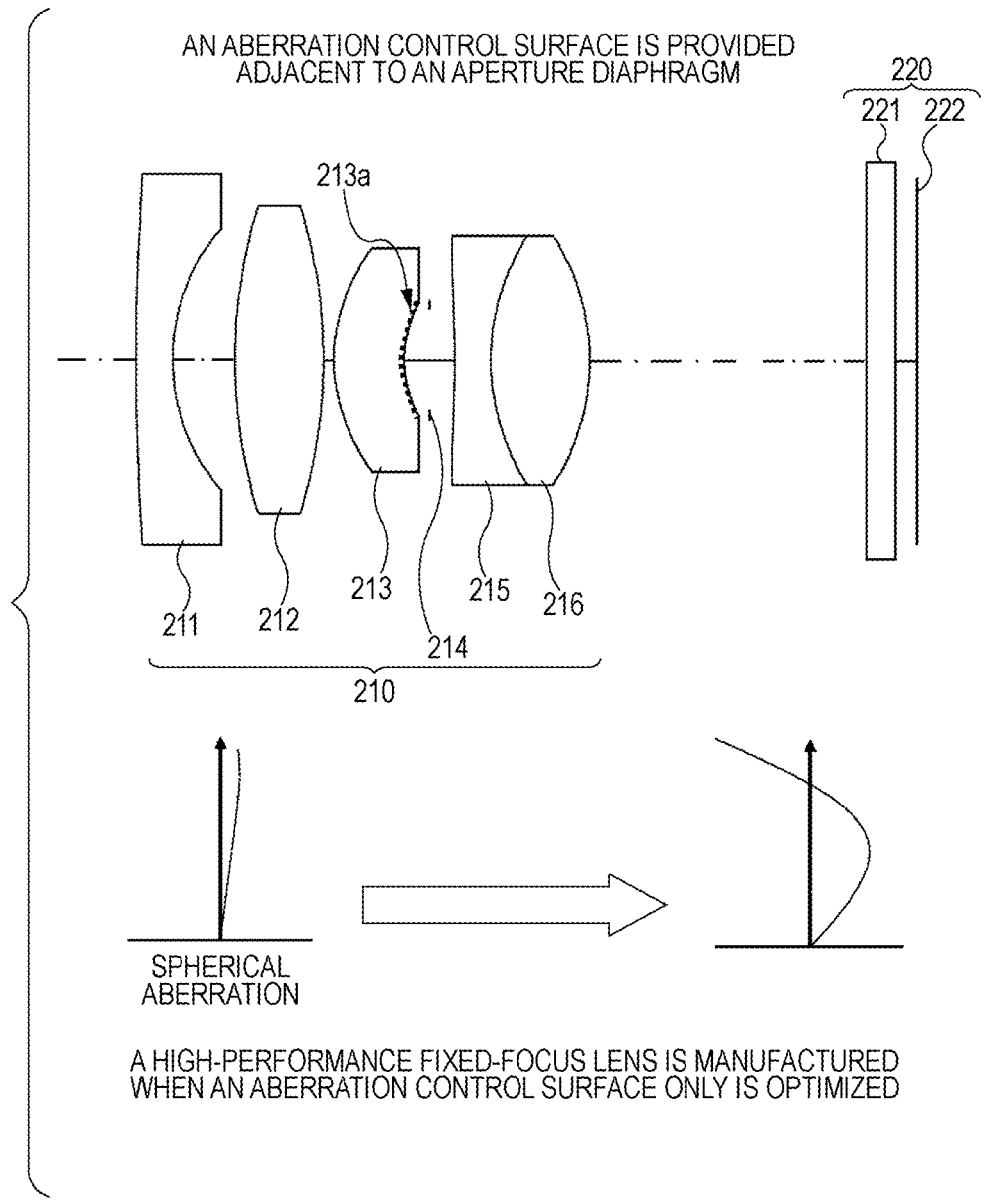

F No is 3.5

F No is 3.5

SENSOR OPENING

SENSOR OPENING

SHADING IN CENTRAL REGION

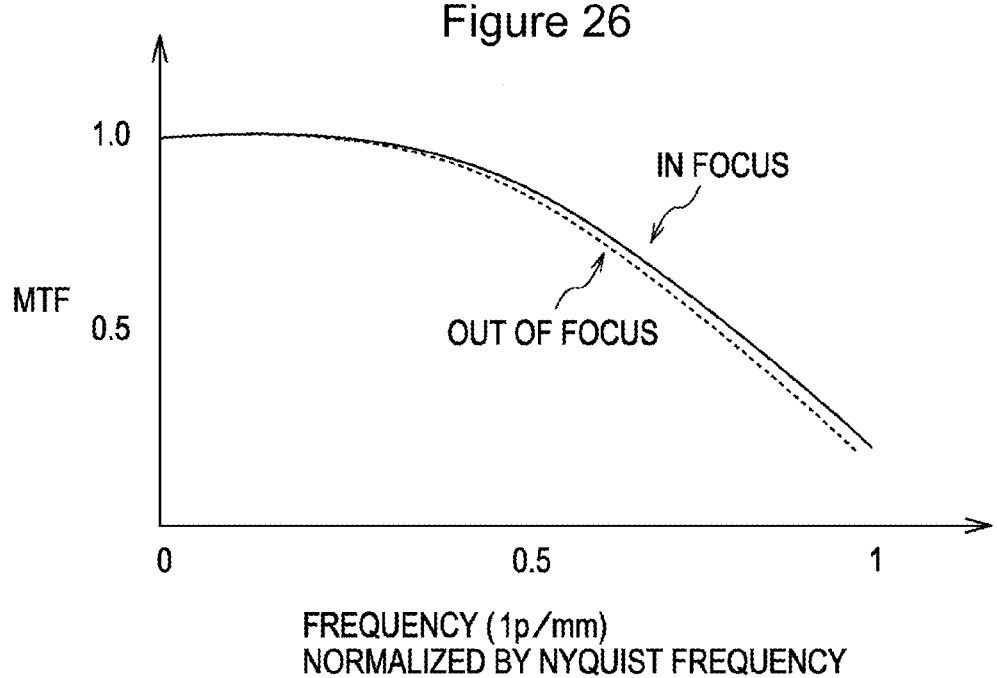

IMAGING DEVICE AND METHOD

CROSS-REFERENCE TO RELATED APPLICATION

The present application claims priority under 35 U.S.C. §119 to Japanese Patent Application No. 2008-169105, filed on Jun. 27, 2008, entitled "IMAGE PICKUP APPARATUS AND ELECTRONIC DEVICE". The content of which is incorporated by reference herein in its entirety.

FIELD OF THE INVENTION

The present invention relates generally to image pickup apparatuses and electronic devices, and more particularly relates to an image pickup apparatus which includes an image pickup device and an optical system.

BACKGROUND

With the rapid development of digitalization of information, digitalization in image processing is increasingly required. In digital cameras in particular, solid-state image pickup devices, such as Charge Coupled Devices (CCD) and Complementary Metal Oxide Semiconductor (CMOS) sensors, have been mainly provided on imaging planes instead of films.

In image pickup apparatuses including CCDs or CMOS sensors, an image of an object is optically taken by an optical system and is extracted by an image pickup device in a form of an electric signal. Such apparatuses may be used in digital still cameras, video cameras, digital video units, personal computers, mobile phones, PDAs, image inspection apparatuses, industrial cameras used for automatic control, and the like.

An image pickup apparatus, in which light is regularly dispersed by a phase plate and is reconstructed by digital processing to achieve a large depth of field, has been suggested. In the present market for imaging devices, miniaturization is desired. In order to meet this need for miniaturization, a lower height of a lens unit and a higher sensitivity for imaging devices is desired.

If a micro lens array is arranged at the pre-stage of a solid-state imaging element in order to improve the sensitivity, the quantity of light that enters each pixel of the solid-state imaging element can be efficiently collected. The light collecting efficiency to the pixel of the solid-state imaging element improves if the micro lens corresponding to the pixel of each solid-state imaging element is used. However, if the center of the micro lens is arranged on the normal line of the center of the pixel of each solid-state imaging element, the light collecting efficiency lowers as the light diagonally enters at the lens arranged at the peripheral part. As a result, shading in which the peripheral part becomes a dark image occurs. Consideration is made in shifting the position of the micro lens towards the center side in the direction of the peripheral part, but this is not sufficient. Thus, further increasing the quantity of light that enters each pixel and enhancing the sensitivity are desired.

The shading that occurs caused by various complex factors can be appropriately corrected by combining a plurality of correcting functions for every factor. However, reducing the shading by a simple method is desired as the processing amount of the correction by image signal processing significantly increases with increase in the number of pixels and the condition parameters.

In addition, in the known image pickup apparatuses, it is premised that a Point Spread Function (PSF) obtained when the above-described phase plate is placed in an optical system is constant. If the PSF varies, it becomes difficult to obtain an image with a large depth of field by convolution using a kernel.

Therefore, setting single focus lens systems aside, in lens systems such as zoom systems and autofocus (AF) systems, there is a problem in adopting the above-mentioned structure because high precision is required in the optical design and costs are increased accordingly. More specifically, in known image pickup apparatuses, a suitable convolution operation cannot be performed and the optical system must be designed so as to eliminate aberrations, such as astigmatism, coma aberration, and zoom chromatic aberration that cause a displacement of a spot image at wide angle and telephoto positions. However, to eliminate the aberrations, the complexity of the optical design is increased and the number of design steps, costs, and the lens size are increased. Therefore, there is a need for simplified image processing systems.

SUMMARY

An image processing method and apparatus operable for processing images is disclosed. The image processing method allows for drawing any given image in an output image on which various types of image processing have been performed. Such various types of image processing are, for example, correction of an image having distortion due to the distortion aberration of an imaging lens, an image having unnatural perspective distortion of a subject due to high-angle or overhead photography, generation of an output image with the viewpoint changed from the viewpoint of a captured image, mirror-image conversion of a captured image, and electronic zooming. Embodiments of the present invention also relate to an imaging apparatus that uses the image processing method.

A first embodiment comprises an imaging device. The imaging device comprises an aberration control optical system comprising a lens and an aberration control unit for causing aberration. The imaging device further comprises an imaging element for imaging a subject image passed through the aberration control optical system. The angle formed by an optical axis and a light beam passed through the aberration control optical system is smaller than an angle formed by the optical axis and a light beam from an outermost peripheral part of the lens defining an image side numerical aperture of the optical system not including the aberration control unit.

A second embodiment comprises an imaging method. The method comprises receiving a light in a lens system and causing aberration to the light to obtain an aberated light. The method further comprises controlling an incident angle of the light entering an imaging element to be smaller than an incident angle of an optical system that does not cause the aberration. The method further comprises imaging the aberated light on a light receiving surface of the imaging element to obtain a one-dimensional image in which a PSF is diffused. The method also comprises performing image processing for restoring the PSF of the one-dimensional image to one pixel.

BRIEF DESCRIPTION OF THE DRAWINGS

Embodiments of the present invention are hereinafter described in conjunction with the following figures, wherein like numerals denote like elements. The figures are provided for illustration and depict exemplary embodiments of the invention. The figures are provided to facilitate understanding of the invention without limiting the breadth, scope, scale, or applicability of the invention. The drawings are not necessarily made to scale.

FIGS. 6A-6B show a basic configuration example of an imaging lens unit forming the optical system.

FIG. 26 illustrates an exemplary diagram illustrating the MTF response obtained after image processing process in the image pickup apparatus according to an embodiment of the invention.

DETAILED DESCRIPTION OF EXEMPLARY EMBODIMENTS

The following detailed description is exemplary in nature and is not intended to limit the invention or the application and uses of the embodiments of the invention. Descriptions of specific devices, techniques, and applications are provided only as examples. Modifications to the examples described herein will be readily apparent to those of ordinary skill in the art, and the general principles defined herein may be applied to other examples and applications without departing from the spirit and scope of the invention. Furthermore, there is no intention to be bound by any expressed or implied theory presented in the preceding technical field, background, brief summary or the following detailed description. The present invention should be accorded scope consistent with the claims, and not limited to the examples described and shown herein.

Embodiments of the invention are described herein in the context of practical non-limiting applications, namely image processing. Embodiments of the invention, however, are not limited to such image processing applications, and the techniques described herein may also be utilized in other optical applications. For example, embodiments may be applicable to image projection.

As would be apparent to one of ordinary skill in the art after reading this description, these are merely examples and the embodiments of the invention are not limited to operating in accordance with these examples. Other embodiments may be utilized and structural changes may be made without departing from the scope of the exemplary embodiments of the present invention.

The following description is presented to enable a person of ordinary skill in the art to make and use the embodiments of the invention. Descriptions of specific devices, techniques, and applications are provided only as examples. Various modifications to the examples described herein will be readily apparent to those of ordinary skill in the art, and the general principles defined herein may be applied to other examples and applications without departing from the spirit and scope of the embodiments of the present invention. Thus, the embodiments of the present invention are not intended to be limited to the examples described herein and shown, but are to be accorded the scope consistent with the claims.

Figure 1:
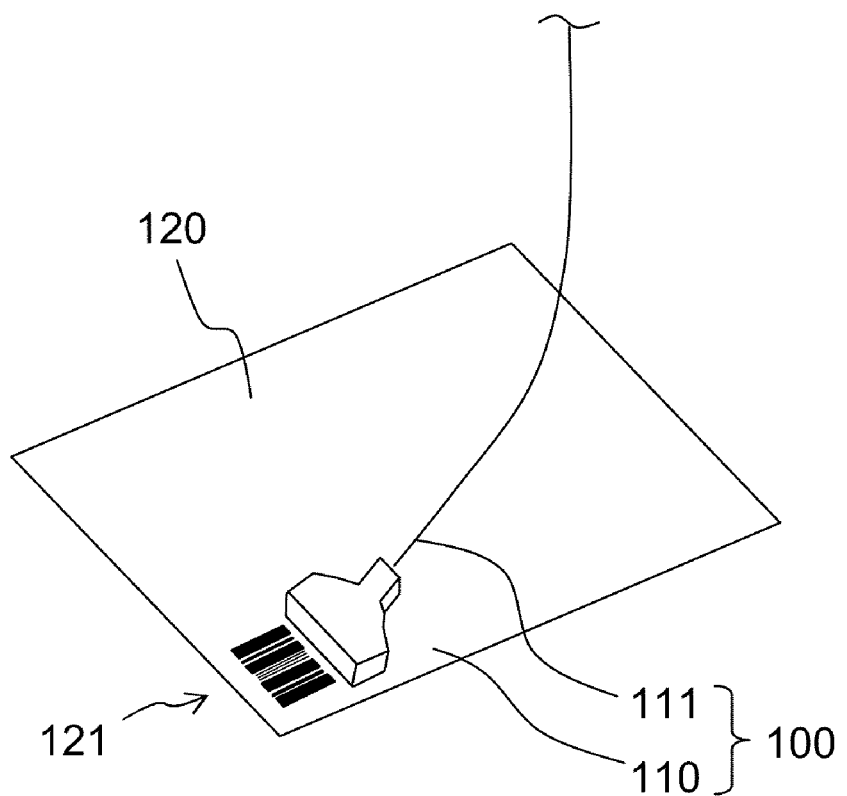
FIG. 1 illustrates an outer appearance view showing an exemplary information code reading device serving as an electronic device according to an embodiment of the present invention.
Figure 2A:
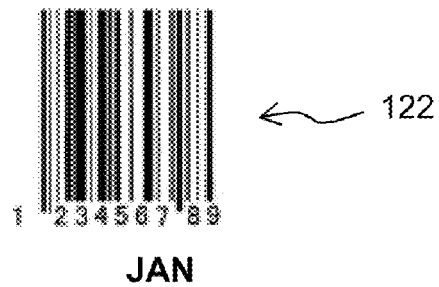
FIG. 2A illustrates an exemplary JAN code as an example of an information code.
Figure 2B:
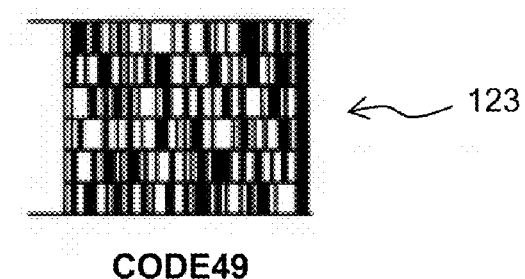
FIG. 2B illustrates an exemplary CODE 49 code as an example of an information code.
Figure 2C:
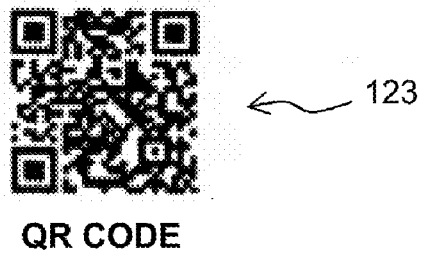
FIG. 2C illustrates an exemplary QR code as an example of an information code.
Figure 3:
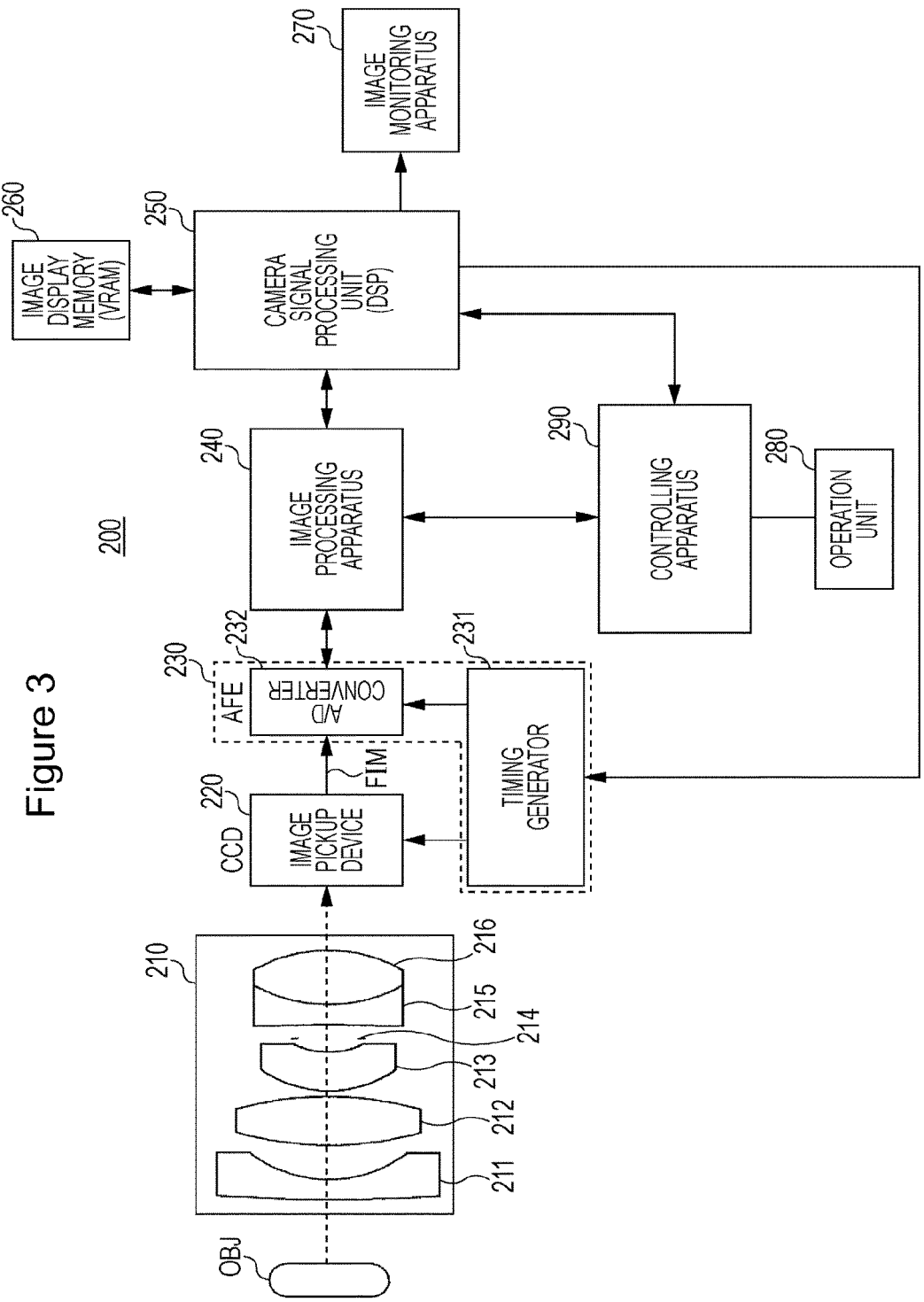
FIG. 3 illustrates a block diagram showing an exemplary configuration of an imaging device applicable to the information code reading device of FIG. 1.

FIG. 1 is an outer appearance view showing one example of an information code reading device serving as an electronic device according to an embodiment of the present invention. FIGS. 2A to 2C are views showing an example of an information code. FIG. 2A shows an example of a JAN code, FIG. 2B shows an example of a CODE 49, and FIG. 2C shows an example of a QR code. FIG. 3 is a block diagram showing a configuration of an imaging device applicable to the information code reading device of FIG. 1. Here, an information code reading device is illustrated as an electronic device applicable to the imaging device of the present embodiment.

As shown in FIG. 1, the information code reading device 100 according to the present embodiment is a device, which main body 110 is connected with a processing device such as an electronic register (not shown) by way of a cable 111, capable of reading an information code 121 such as a symbol and a code having different reflectivity printed on a reading object 120 and the like.

The information code to be read may be a one-dimensional barcode 122 (FIG. 2A) such as the JAN code, or a two-dimensional barcode 123 such as a stack-type CODE 49 (FIG. 2B) or a matrix type QR code (FIG. 2C).

Figure 4:
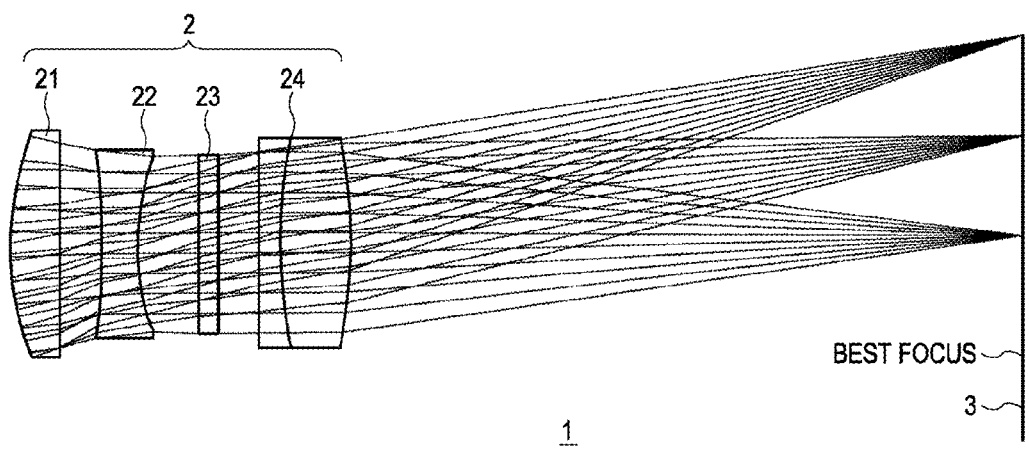
FIG. 4 illustrates a schematic diagram illustrating the structure of an image pickup apparatus and traces of light ray bundles.

FIG. 4 is a schematic diagram illustrating a structure of an image pickup apparatus 1 and traces of light ray bundles. The image pickup apparatus 1 comprises an optical system 2 and an image pickup device 3. The optical system 2 includes object-side lenses 21 and 22, an aperture stop 23, and an imaging lens 24 arranged in order from an object side (OBJS) toward the image pickup device 3. The image pickup device 3 may, without limitation, be a semiconductor sensor such as a CCD and a CMOS sensor.

The object-side lenses 21 and 22 focus the image of an object before the aperture stop 23, and the imaging lens 24 focuses the image of an object after the aperture stop 23.

Figure 5A:
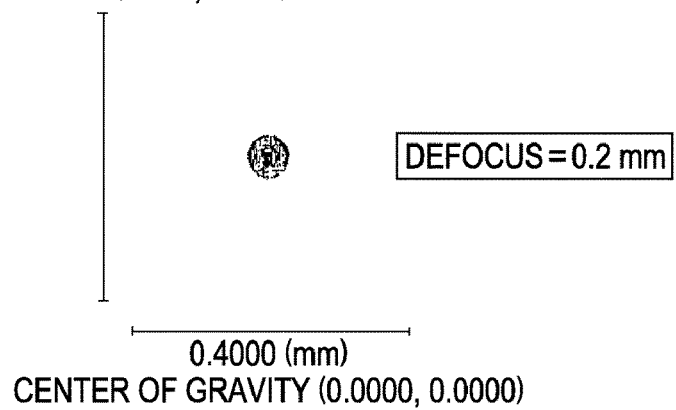
FIG. 5A illustrates exemplary spot images formed on a light-receiving surface of an image pickup device in the image pickup apparatus shown in FIG. 4 when a focal point is displaced by 0.2 mm (Defocus=0.2 mm).
Figure 5B:
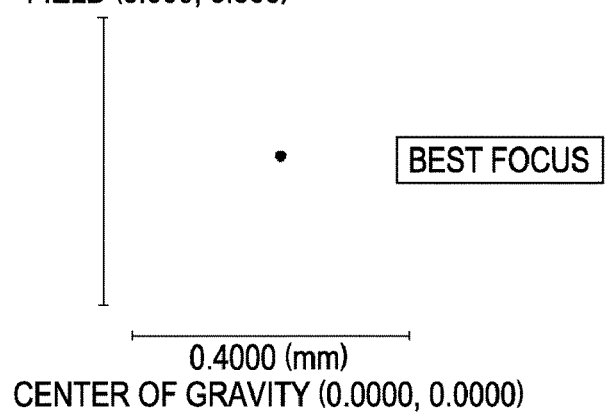
FIG. 5B illustrates exemplary spot images formed on a light-receiving surface of an image pickup device in the image pickup apparatus shown in FIG. 4 when the focal point is not displaced (Best focus).
Figure 5C:
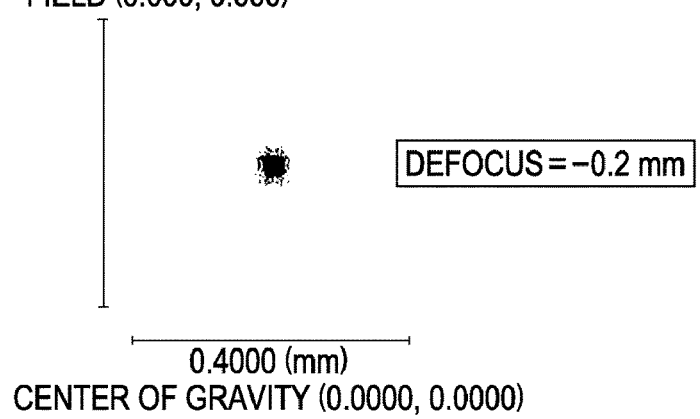
FIG. 5C illustrates exemplary spot images formed on a light-receiving surface of an image pickup device in the image pickup apparatus shown in FIG. 4 when the focal point is displaced by −0.2 mm (Defocus=−0.2 mm).

Referring to FIG. 4, in the image pickup apparatus 1, the best-focus plane coincides with the plane on which the image pickup device 3 is disposed. FIGS. 5A to 5C illustrate spot images formed on a light-receiving surface of an image pickup device 3 in the image pickup apparatus 1 shown in FIG. 1 when a focal point is displaced by 0.2 mm (Defocus=0.2 mm), when the focal point is not displaced (Best focus) or when the focal point is displaced by −0.2 mm (Defocus=−0.2 mm), individually.

FIG. 3 illustrates a block diagram showing an exemplary configuration of an imaging device applicable to the information code reading device of FIG. 1. The image pickup apparatus 200 (imaging device 200) according to the present embodiment includes the aberration control optical system 210 and the image pickup device 220 (imaging element 220) for obtaining the first image, and also includes the image processing device 240 for forming the final high-definition image from the first image. The aberration control optical system 210 is provided with an aberration controlling element or an optical element, such as, without limitation, a glass element and a plastic element, having a surface processed so as to control an aberration, so that the wavefront of light can be changed (modulated). The light with the modulated wavefront forms an image, i.e., the first image, on the imaging plane (light-receiving surface) of the image pickup device 220.

According to an embodiment, the image pickup apparatus 200 is configured to function as an image-forming system that can obtain a high-definition image from the first image through the image processing device 240.

In the present embodiment, the first image obtained by the image pickup device 220 is in light conditions with an extremely large depth of field. Therefore, a modulation transfer function (MTF) of the first image is low, and is corrected by the image processing device 240.

As shown in FIG. 3, the imaging device 200 includes an aberration control optical system 210 and an imaging element 220 (image pickup device 220). The imaging device 200 further includes an analog front end unit (AFE) 230, an image processing device 240, a camera signal processing unit 250, an image display memory 260, an image monitoring device 270, an operation unit 280, and a control device 290.

Referring to FIG. 3, the image pickup device 220 may include a CCD or a CMOS sensor on which the image received from the aberration control optical system 210 is formed and which outputs first image information representing the image formed thereon to the image processing device 240 via the AFE unit 230 as a first image electric signal (FIM).

The AFE unit 230 may include a timing controller 231 and an analog/digital (A/D) converter 232. The timing controller 231 controls timing for driving the CCD in the image pickup device 220. The A/D converter 232 converts an analog signal input from the CCD into a digital signal, and can output the thus-obtained digital signal to the image processing device 240.

The image processing device 240 can receive the digital signal representing the picked-up image from the AFE unit 230, subject the signal to a image processing process such as edge enhancement process and the like, improve the contrast which is lowered by the aberration control optical system 210, and output the result to the camera signal processor 250 (e.g., a digital signal processor (DSP)).

The camera signal processor (or the digital signal processor (DSP)) 250 is operable to perform, without limitation, processes including color interpolation, white balancing, YCbCr conversion, compression, filing, etc., stores data in the memory 260, and displays images on the image monitoring device 270.

The controller 290 is operable to perform exposure control, receive operation inputs from the operating unit 280 and the like, and determine the overall operation of the system on the basis of the received operation inputs. Thus, the controller 290 can control the AFE unit 230, the image processing device 240, DSP 250, the aperture stop 214, and the like, so as to perform aberration control of the overall system.

Figure 6B:
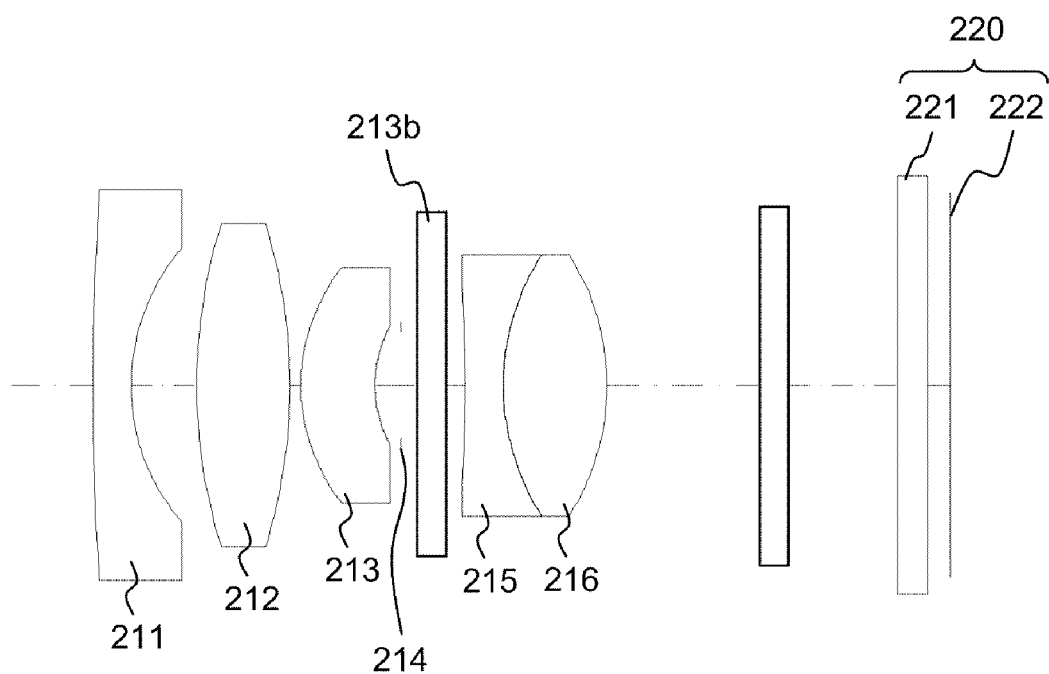

FIG. 6 shows a basic configuration example of an imaging lens unit forming the optical system. FIG. 6A shows an example in which an aberration control surface is adopted for the aberration control unit. FIG. 6B shows an example in which the aberration control surface serving as the aberration control unit also functions as an aperture.

The imaging device 200 (FIG. 3) includes the aberration control optical system 210 and the imaging element 220. The aberration control optical system 210 includes a plurality of lenses 211 to 216, and an aberration control unit 213. In the present embodiment, the aberration control optical system 210 is referred to as the aberration control optical system 210 as it controls the aberration.

The aberration control optical system 210 provides an image photographed with a subject object OBJ to the imaging element 220. The aberration control optical system 210 is arranged with a first lens 211, a second lens 212, a third lens 213, an aperture 214, a fourth lens 215, and a fifth lens 216 in order from the object side, but is not limited thereto. The fourth lens 215 and the fifth lens 216 are joined. The aberration control optical system 210 may also include a cemented lens.

The imaging element 220 (FIG. 6A) has a plane parallel plate made of glass (cover glass) 221, and an imaging plane 222 of the imaging element 220 arranged in order from the fifth lens 216 side. The light from the subject OBJ through the aberration control optical system 210 is imaged on the imaging plane 222 of the imaging element 220. A subject dispersed image imaged with the imaging element 220 is not focused on the imaging element 220 by the aberration control surface 213a, and is an image formed with a light flux of deep depth and blurred portion.

The aberration control unit 213 has an aberration control function for intentionally causing aberration. The aberration control unit 213 includes an aberration control surface 213a or an aberration control element, but is not limited thereto.

FIG. 6A shows an example in which the aberration control surface 213a is applied to the aberration control unit 213. The aberration control surface internally includes an aberration control effect of the aberration control element, to be hereinafter described, at the lens surface, but is not limited thereto. In this embodiment, the aberration control surface 213a is inserted to cause spherical aberration. The aberration control surface 213a includes one surface of the lens. Specifically, the aberration control surface 213a is that in which a third lens R2 surface that becomes the aberration control surface 213a is provided to the normal optical system. The aberration control surface 213a may be adjacent to the aperture 214.

The change in spherical aberration before and after forming the aberration control surface 213a is shown at the lower side of FIG. 6A. A uniform image quality is obtained even if the object appears at the center of the screen and even if the object appears at the periphery by arranging the aberration control surface 213a adjacent to the aperture 214 and optimizing the aberration control surface 213a. As a result, a fixed focus lens having high performance as a final output image signal of the imaging device 200 is obtained.

FIG. 6B is an example in which the aberration control element is applied for the aberration control unit 213. Thus, the aberration control effect can also be obtained by inserting the aberration control element of another element in the aberration control optical system 210. A liquid lens and a liquid crystal lens are known as representative examples for realizing the aberration control element. The liquid lens and the liquid crystal lens can change the index of refraction by changing the plane shape or the orientation of the liquid crystal through application of voltage. The spherical aberration can be controlled with such change by also arranging the aberration control element adjacent to the aperture.

The aberration control element can be easily inserted to an optical system. In other words, the spherical aberration can be easily controlled by inserting the aberration control element to the optical system. The aberration control element may, without limitation, be a variable control element such as liquid crystal lens or liquid lens, or may be an invariable control element made of glass or resin. If an element in which the aberration is invariable is used, the element includes the aberration control surface. The aberration control surface may be that in which the necessary aberration is added to the lens surface.

The aperture function may be given to the aberration control element (such as 213a in FIG. 6A) itself, and the aperture may be omitted.

If the aberration control element itself has the aperture function, a uniform image quality can be obtained even if the object appears at the center of the screen or appears at the periphery. As a result, a fixed focus lens having high performance is obtained as a final output image signal of the imaging device.

In FIGS. 6A and 6B, examples in which the aberration control unit 213 is arranged at the interior of the aberration control optical system 210 are shown, but this is not the sole case, and the aberration control unit 213 may be arranged at the exterior of the aberration control optical system 210.

The aberration control optical system 210 has an angle formed by the light beam passed through the aberration control optical system 210 and the optical axis smaller than the angle formed by the light beam from the outermost peripheral part of the lens defining the image side numerical aperture of the optical system without the aberration control unit 213 and the optical axis. In other words, the aberration control function causes at least the spherical aberration on the positive side, and the maximum incident angle of the light beam to the light receiving surface of the imaging element 220 is closer to perpendicular compared to a state in which the aberration control function is not provided.

Furthermore, in the present embodiment, equation (1) shown below is satisfied, where Um is the maximum of the angles formed by the light beam passed through the aberration control optical system 210 and the optical axis, and K is the maximum angle formed by the limit incident light beam at which the imaging element 220 can tolerate the influence of shading and the optical axis.

$$1/(2*\sin Um) > 1/(2*\sin K) \quad (1)$$

Figure 7:
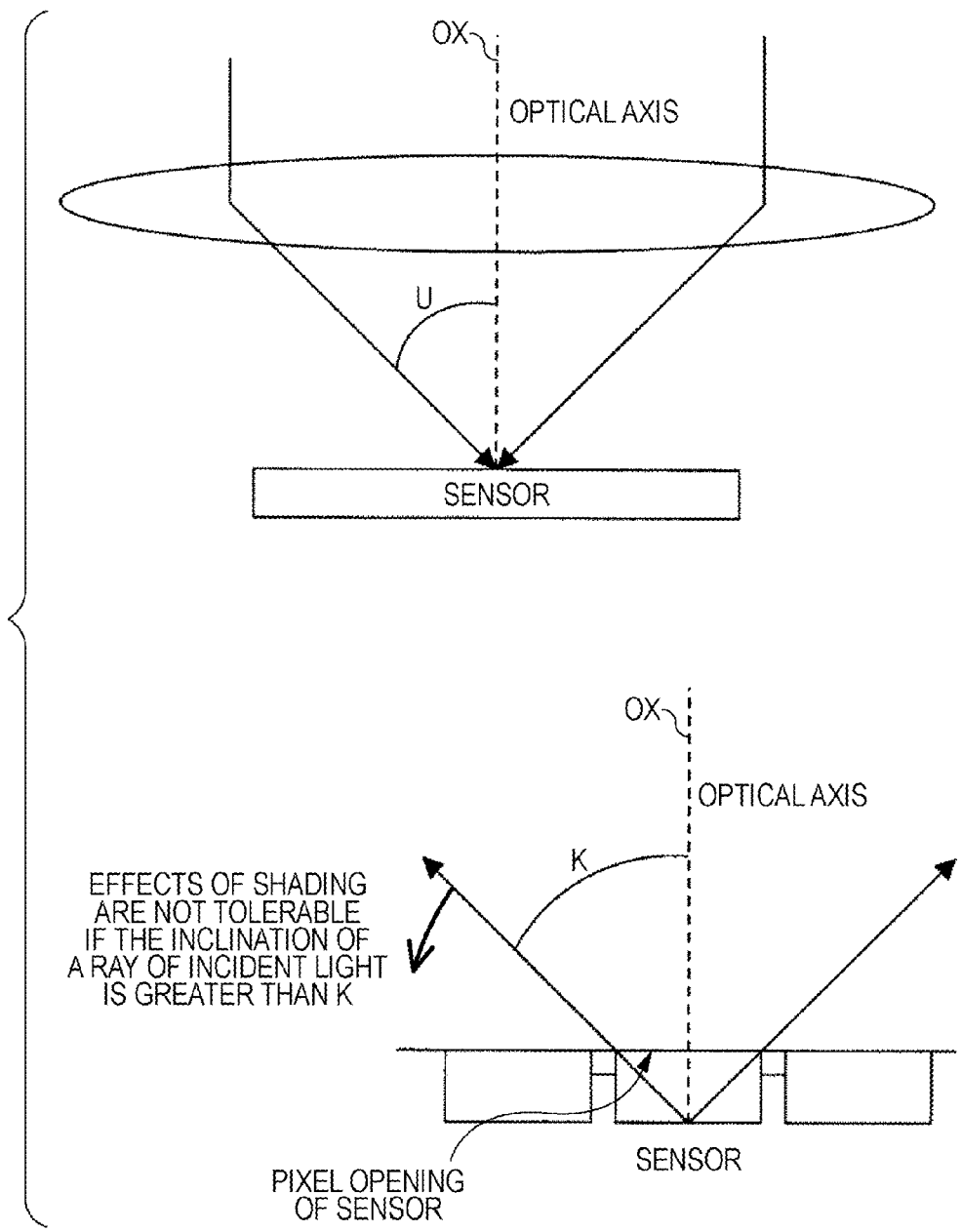
FIG. 7 is a view for describing the conditions of the maximum incident light angle with respect to the optical axis.

FIG. 7 is a view for describing the conditions of the maximum incident light angle with respect to the optical axis. If the angle formed by the peripheral edge light beam parallel to the optical axis OX and the optical axis at the image boundary is U, sin U is the numerical aperture NA of the image side. If the sine condition of equation (1) is satisfied, the following second equation is satisfied between the NA and the F number (Fno).

$$Fno = 1/(2*NA) = 1/(2*\sin U) \quad (2)$$

According to equation (2) above, U is determined by the Fno of the lens. Furthermore, the imaging element 220 included in the imaging device 200 also has a unique NA that takes into view the limit of influence of the shading and the like. Generally, the opening Fno of the lens is also limited with the NA of the imaging element 220, but the aberration control optical system 210 can be optimized without lowering the quantity of light while maintaining the opening Fno of the lens in accordance with the NA of the imaging element 220 through the use of the configuration of the present embodiment. In the present embodiment, the spherical aberration is used for such means. Equation (1) is satisfied by using the spherical aberration. In equation (1), the angle formed by the peripheral edge light beam parallel to the optical axis using the aberration control element such as aberration control element 213a and the optical axis at the image boundary is Um, and the angle formed by the limit incident light beam at which the imaging element 220 can tolerate the influence of shading and the optical axis is K.

In the aberration control optical system 210 (FIG. 6A) of the present embodiment, the shape of the aspheric surface of the lens is positive in the direction from the object side towards the image plane side, and is expressed with the following equation (3) where k as the conical coefficient, A, B, C, and D are aspheric surface coefficients, and r is the center curvature radius. Furthermore, h represents the height of the light beam and c represents the inverse number of the center curvature radius. However, Z represents the depth from the tangent plane with respect to the plane vertex, A is the aspheric surface coefficient of fourth order, B is the aspheric surface coefficient of sixth order, C is the aspheric surface coefficient of eighth order, and D is the aspheric surface coefficient of tenth order.

Aspheric surface equation (3):

$$Z = \frac{ch^2}{1 + \sqrt{1 - (1+k)c^2 h^2}} + Ah^4 + Bh^6 + Ch^8 + Dh^{10} \quad (3)$$

Alternatively, the shape of the aspheric surface of the lens can be expressed with a polynomial surface equation (4) or Zernike surface equation (5) shown below. The Zernike surface equation (5) of the polynomial surface equation (4) is not limited thereto, but is a Zernike equation of fourteenth order.

Polynomial surface equation (4):

$$z = \exp\left\{ix\left(\sum_{j=1} C_j x^m y^n\right)\right\} \quad (4)$$

Where i is sqrt(−1), x an y are axes perpendicular to the optical axis of the lens, n and m are integers, and $$j = \frac{[(m+n)^2 + m + 3n]}{2} |x| \le 1 |y| \le 1$$

Zernike surface equation (5) (e.g., Zernike equation of fourteenth order):

$$Z = \rho(3 - 12\rho^2 + 10\rho^4)\cos(\theta) \quad (5)$$

where $\rho = h^2$, h represents the height of the light beam and θ represents an angle of a radial direction on an optic axis.

As shown in FIGS. 6A and 4B, the imaging element 220 has a glass plate 221 and the imaging plane 222 of the imaging element 220 arranged in order from the fifth lens 216 side. The glass plate 221 may be a plane parallel plate made of glass such as cover glass, but is not limited thereto. The imaging element 220 may be a CCD or a CMOS sensor, but is not limited thereto.

The light from the subject OBJ passes through the aberration control optical system 210, and is imaged on the imaging plane 222 of the imaging element 220. According to the present embodiment, the subject image imaged at the imaging element 220 is a dispersed image, and is not focused on the imaging element 220. In other words, the light flux becomes a deep depth by the aberration control unit 213, and an image including the blurred portion forms at the imaging plane 222.

In the present embodiment, the light beam incident angle to the imaging element 220 is controlled by using the aberration control unit 213, and the spread PSF is restored by image processing. For example, the light beam incident angle is alleviated by using the aberration control element for mainly causing spherical aberration. In addition, the same operation can be performed by using the aberration control element of polynomial surface, free curved surface by Zernike and the like.

Thus, the incident angle of the light beam that becomes the main cause of shading can be alleviated by the aberration control optical system 210. The occurrence of shading thus can be reduced.

Figure 8A:
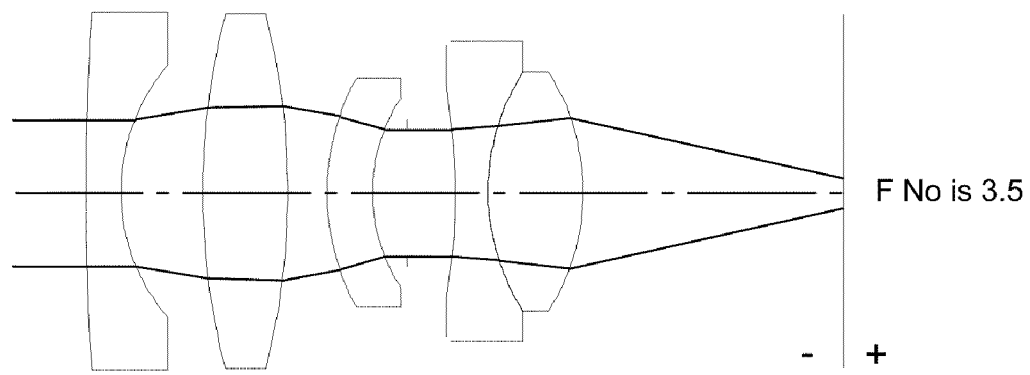
FIG. 8A is a light beam diagram of the optical system including the aberration control unit according to an embodiment of the present invention.
Figure 8B:
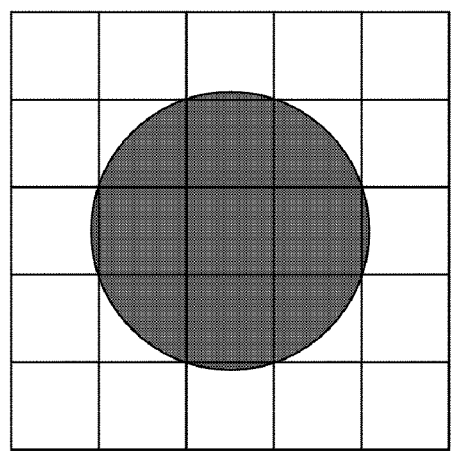
FIG. 8B is a view showing an example of a spot image formed on the imaging plane in FIG. 6A.
Figure 9A:
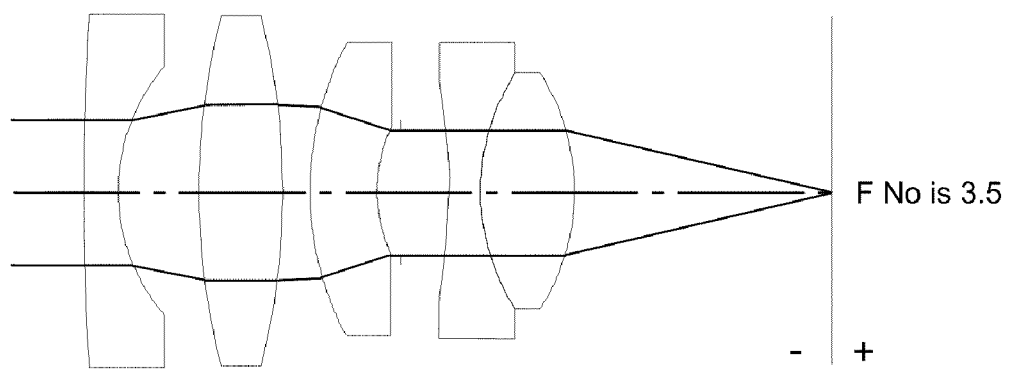
FIG. 9A is a light beam diagram of a normal optical system not including the aberration control unit.
Figure 9B:
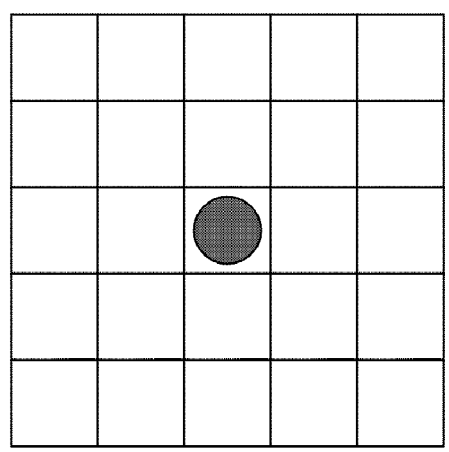
FIG. 9B is a view showing an example of a spot image formed on the imaging plane in FIG. 7A.

FIG. 8A is a light beam diagram of the optical system including the aberration control unit 213 of the present embodiment, and FIG. 8B is a view showing an example of a spot image formed on the imaging plane in FIG. 8A. FIG. 9A is a light beam diagram of a normal optical system not including the aberration control unit, and FIG. 9B is a view showing an example of a spot image formed on the imaging plane in FIG. 9A. In the embodiment shown in FIGS. 8A-8B and 9A-9B, the F number (Fno) is about 3.5.

As shown in FIG. 9, the normal optical system not including the aberration control unit 213 images the subject image with the focus on the light receiving surface of the imaging element 220. Therefore, the light is collected so as to fit within one pixel. As shown in FIGS. 8A-8B, the optical system including the aberration control unit 213 of the present embodiment is not focused on the light receiving surface of the imaging element 220, and the focused position is formed at the distant side (positive side). Therefore, the PSF (point image intensity distribution) crosses two or more pixels.

Figure 10:
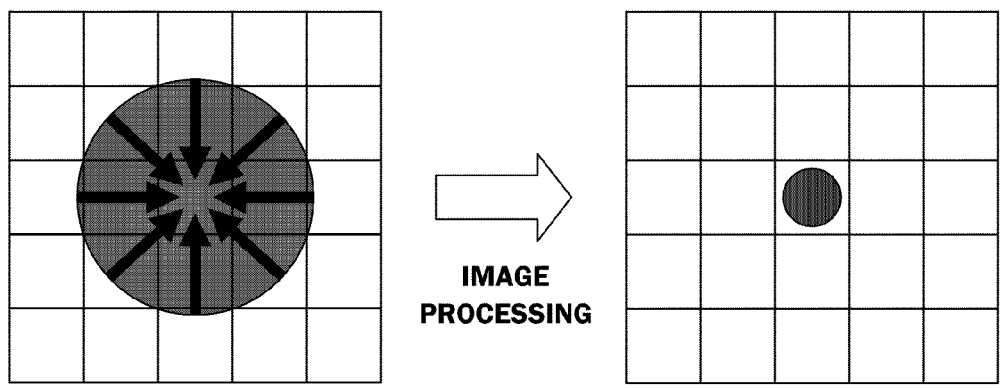
FIG. 10 is a view for describing the image processing on the PSF diffused by the aberration control optical system.
Figure 11:
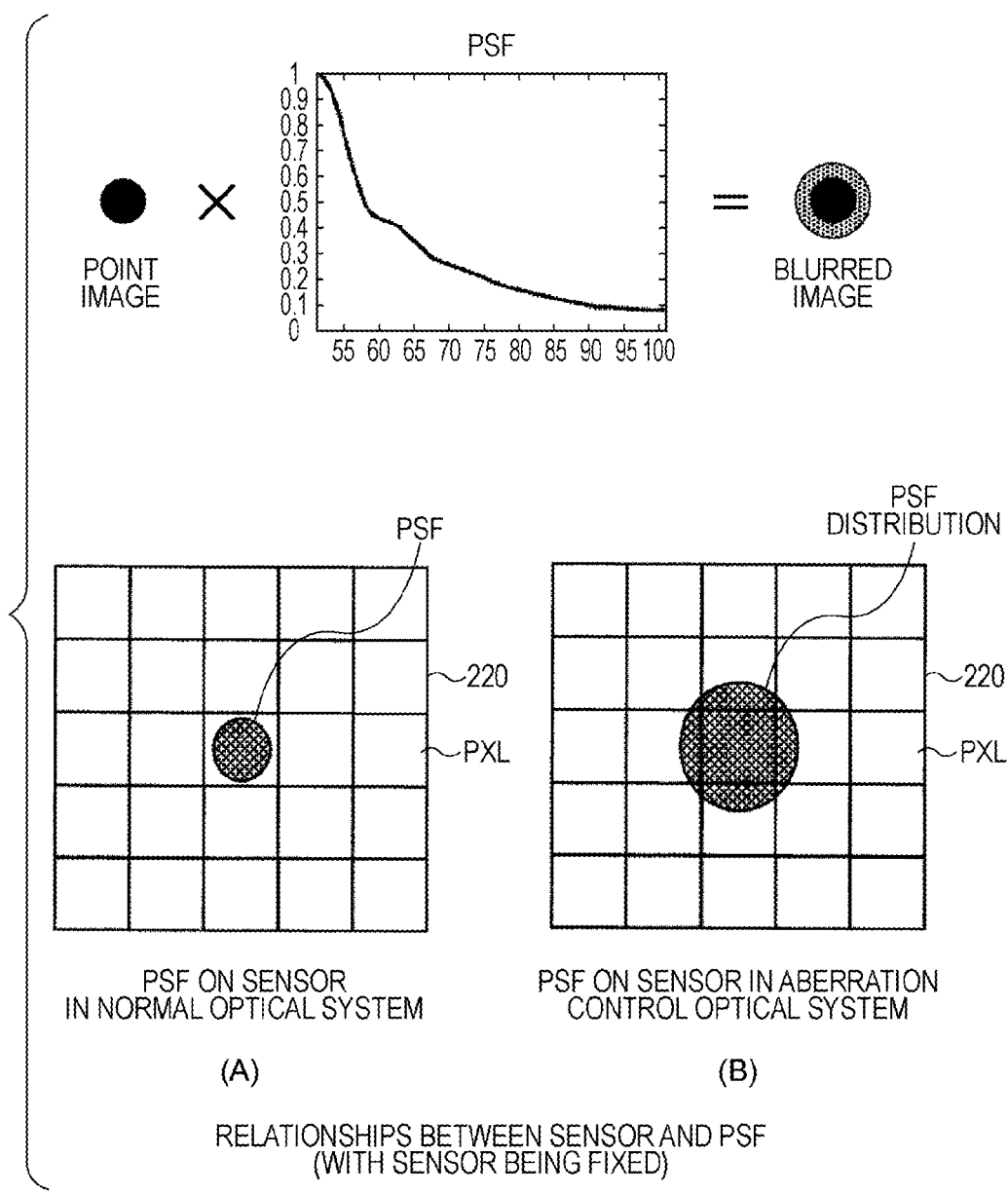
FIGS. 11A-11B, and FIGS. 12A-12B are views for describing the spherical aberration occurrence amount of the aberration control optical system according to an embodiment of the present invention.
Figure 12:
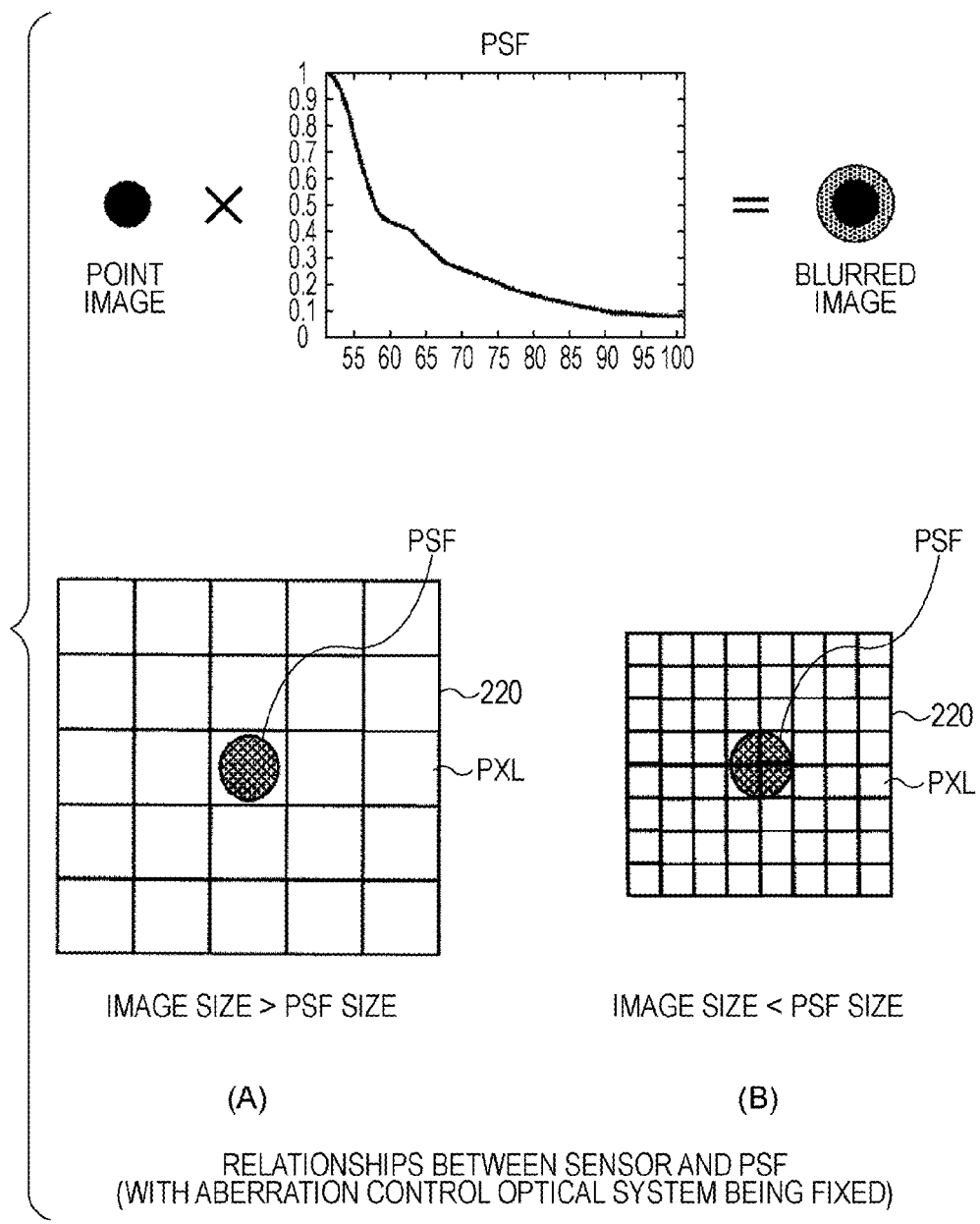

FIG. 10 is a view for describing the image processing on the PSF diffused by the aberration control optical system.

The PSF crossed over two or more pixels is subjected to image processing such that the diffused PSF is restored to one point (one pixel) in the image processing device 240 of post stage.

The characteristic configuration and function of the aberration control optical system 210 will be further described in detail below.

FIGS. 11A and 11B, and FIGS. 12A and 12B are views for describing the spherical aberration occurrence amount of the aberration control optical system according to the present embodiment. FIG. 11 shows a relationship between the sensor and the PSF in the case where the imaging element 220 (sensor) is fixed, and FIG. 12 shows a relationship between the sensor and the PSF in the case where the aberration control optical system is fixed.

The imaging element 220 is a sensor having a specific pixel pitch. In such a case, the spherical aberration needs to occur and the PSF needs to be made larger than one pixel in the present embodiment.

As shown in FIGS. 11A and 12A, even if the spherical aberration occurs at a size the PSF fits within one pixel, this is the same as the normal optical system. In the normal optical system, the size of the center PSF of the focus position generally becomes a minimum. On the other hand, in the aberration control optical system 210 according to the present embodiment, the PSF is controlled to a size that the focus position in addition to the out focus does not fit within one pixel, as shown in FIG. 11B.

The selection of the imaging element 220 (sensor) suited to the aberration control optical system 210 will be described below.

If the aberration control optical system 210 comprising a specific PSF size is provided, the pixel pitch of the sensor smaller than the size of the PSF is preferably selected, as shown in FIG. 12B. If the pixel pitch larger than the PSF is selected, this may become the same as the normal optical system, and the focus is focused. In such a case, the effect of the spherical aberration of the aberration control optical system 210 cannot be effectively obtained.

Figure 13:
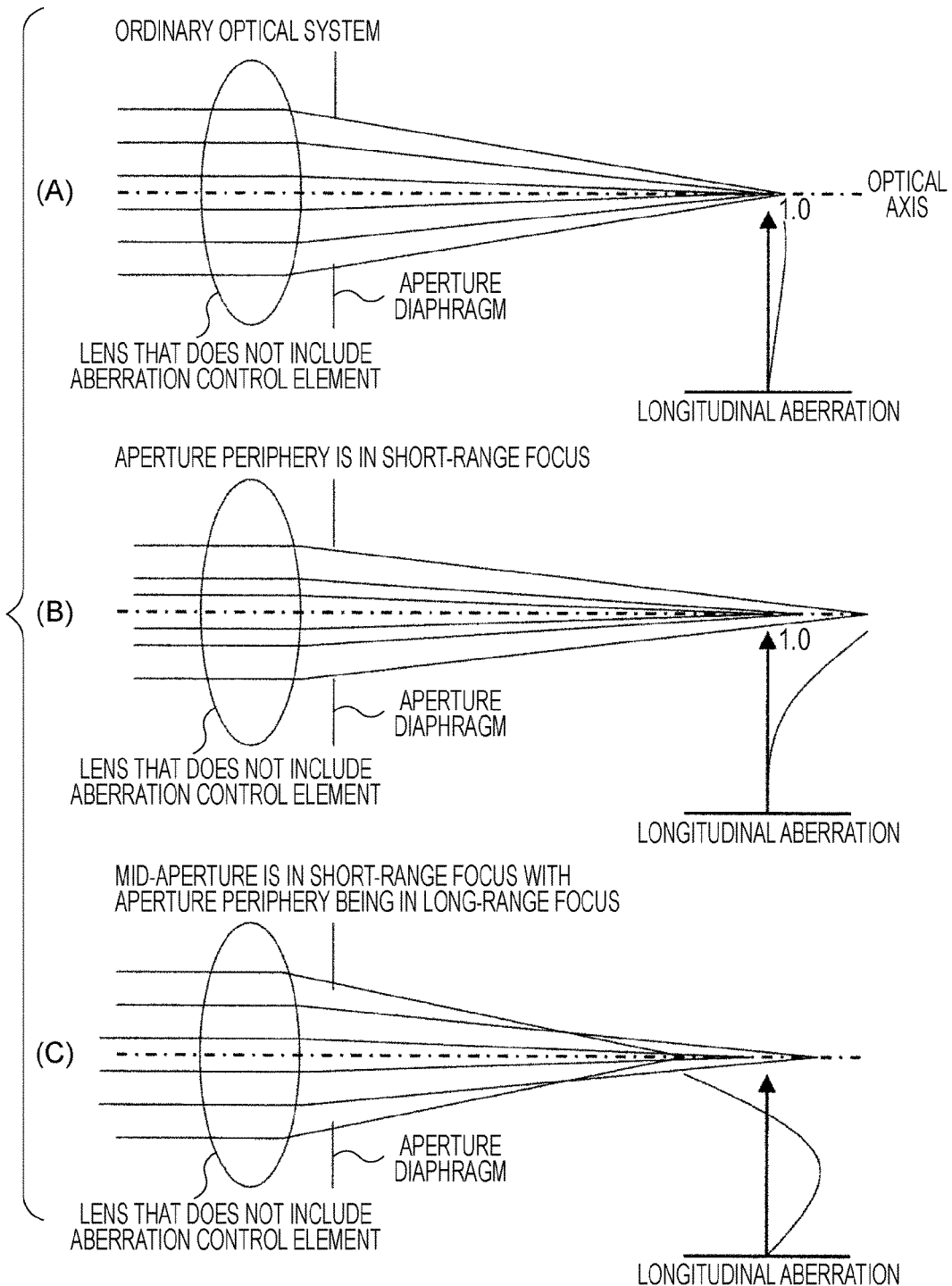
FIGS. 13A-13C show relationships between the spherical aberration by the aberration control element and the imaging.

FIGS. 13A to 13C show relationships between the spherical aberration by the aberration control element (213a) and the imaging. FIG. 13A shows a relationship between the spherical aberration of a general optical system without the aberration control element and the imaging, FIG. 13B shows a relationship between the spherical aberration of the aberration control optical system 210 according to the present embodiment comprising the central area on the optical axis side as the close focus side and the peripheral area as the distant focus side and the imaging, and FIG. 13C shows a relationship between the spherical aberration of the aberration control optical system 210 according to the present embodiment comprising the central area as the distant focus side and the peripheral area as the close focus side and the imaging.

As apparent from FIGS. 13A to 13C, in the aberration control optical system 210 according to the present embodiment, the spherical aberration can be efficiently generated for an aperture diameter at the surface near the aperture compared to the general optical system.

The effect of reducing shading of the aberration control optical system 210 including the aberration control unit 213 of the present embodiment will be reviewed below.

Figure 14:
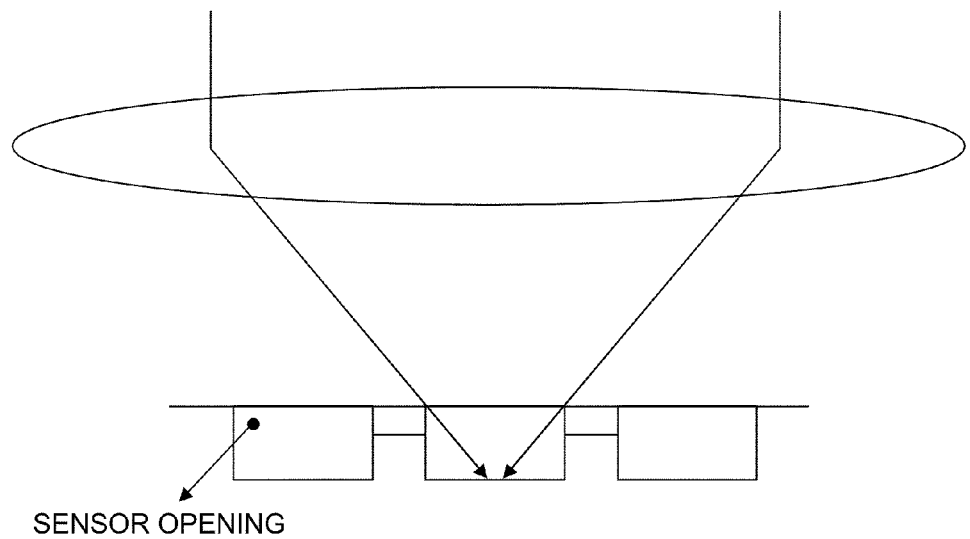
FIG. 14 is a view showing an optical path in the case of a normal lens design in which the micro lens of the sensor is designed with the corresponding sensor opening.
Figure 15:
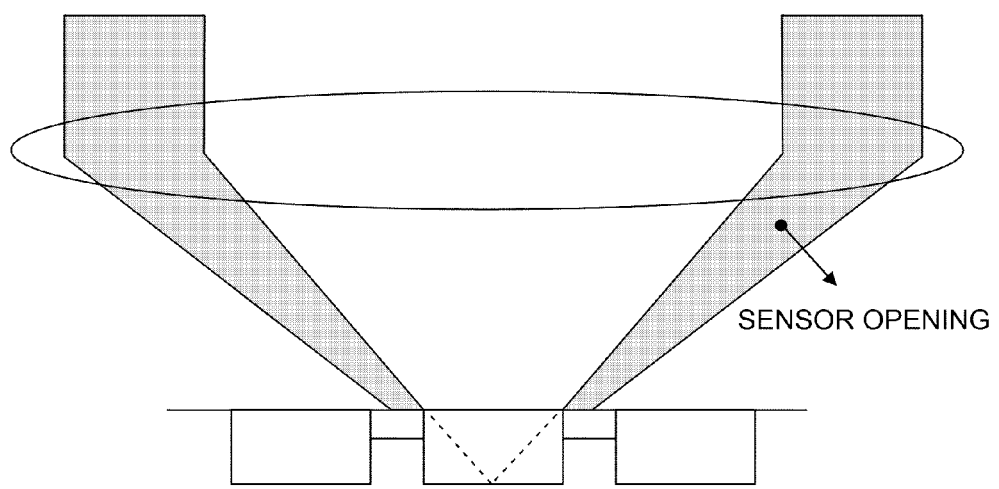
FIG. 15 is a view showing an optical path in the case of using a lens of a brightness exceeding the range the micro lens of the sensor can collect.
Figure 16:
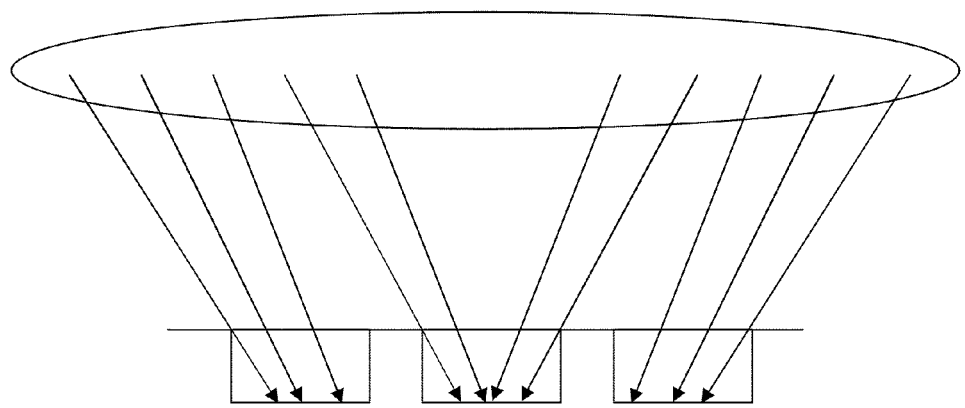
FIG. 16 is a view showing a case in which the light beam incident angle to the sensor is alleviated by using the aberration control element according to an embodiment of the present invention.

FIG. 14 is a view showing an optical path in the case of a normal lens design in which the micro lens of the sensor is designed with the corresponding sensor opening. FIG. 15 is a view showing an optical path in the case of using a lens of a brightness exceeding the range the micro lens of the sensor can collect. FIG. 16 is a view showing a case in which the light beam incident angle to the sensor is alleviated by using the aberration control element of the present embodiment.

The light beam having sharp light beam angle if the sensor is not responded even if the lens is made bright is rejected at the sensor surface. Thus, increase in sensitivity cannot be expected, which becomes the cause of stray light and flare. As a result, the image quality degrades. When attempting to collect the light in one pixel, the light beam incident angle to the sensor becomes sharper in accordance with the Fno, as shown in FIG. 15. On the premise of image processing the same, the light can be efficiently received by the sensor by diverging the light to the peripheral pixels, as shown in FIG. 16.

Figure 17:
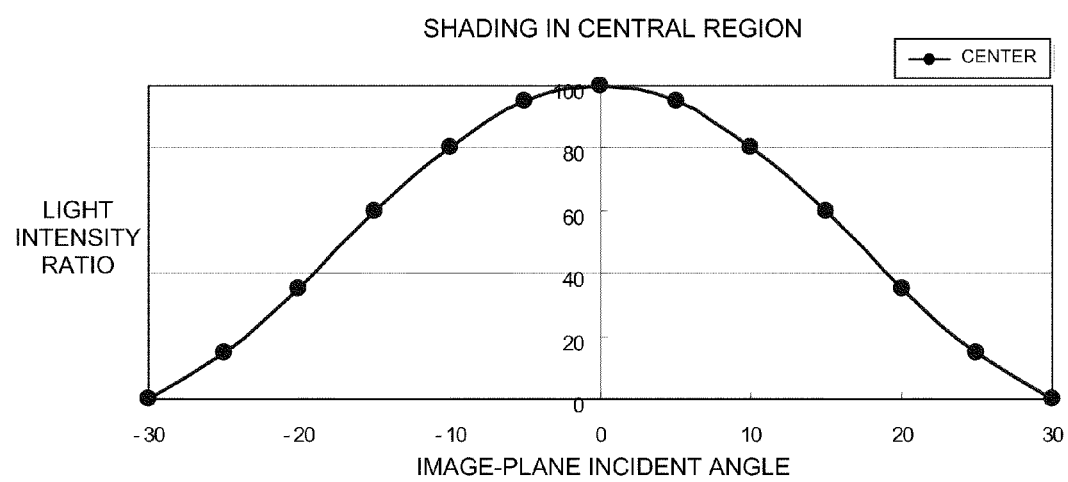
FIG. 17 illustrates an exemplary diagram illustrating the characteristics obtained when the image pickup device has shading.
Figure 18:
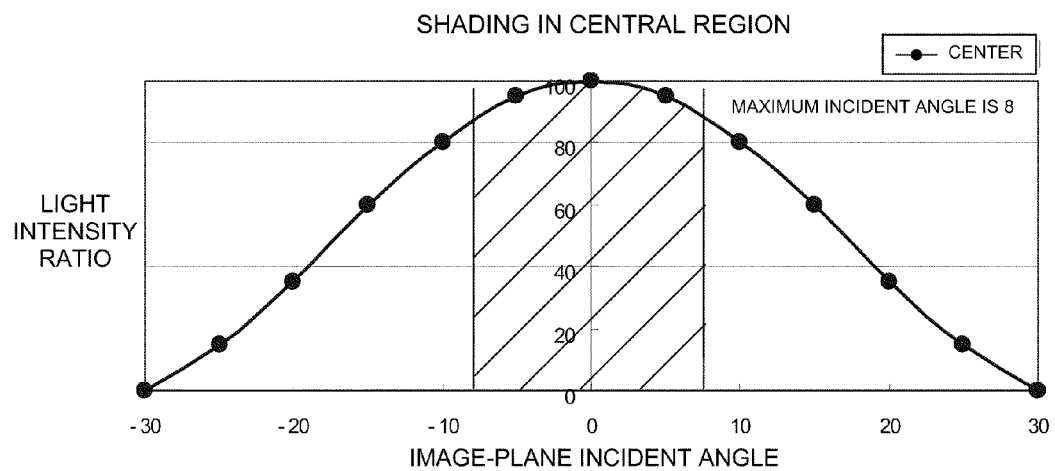
FIG. 18 illustrates an exemplary diagram illustrating the characteristics obtained by an existing optical system.

FIG. 17 is a view showing an example of the shading characteristics of the solid-state imaging element. FIG. 18 is a view showing an example of the shading characteristics of the normal optical system. The shading characteristics show the light receiving efficiency with respect to the light beam incident angle at which the light enters the imaging element 220. For example, at the central area of the imaging element, the efficiency is highly satisfactory and is about 100% when the light enters the imaging element 220 perpendicularly (0 degree). However, if the light enters with an angle or at an angle of about 10 degrees, for example, the efficiency lowers to about 80%. Actually, the light beam reaches the imaging element 220 as a continuous light flux within a constant angle corresponding to the NA.

In FIG. 18, the area surrounded with diagonal lines shows the angle characteristics in which Fno is about 3.5. In FIG. 18, the area surrounded with diagonal lines shows the light beam incident angle characteristics in which Fno is 3.5.

The shading characteristics of the imaging element 220 are not taken into consideration for the characteristics of lowering in the peripheral light quantity by the vignetting of the lens. However, since the image that is actually output is seen through the imaging element 220, such characteristics cannot be ignored. Thus, the actual light quantity degrades by the amount of shading. The specific correction amount will be described below. Assuming a case in which the peripheral light quantity of the lens does not influence the imaging element 220, an area of a rectangular area shown with an angle of about ±8 of the horizontal axis and the vertical axis of 100 is set as the reference of comparison in FIG. 18. Actually, however, the efficiency lowers in the light having angle, and thus the area surrounded by the shaded lines of FIG. 18 (rectangle with rounded top) becomes the target. The area ratio is found to be about 90% with respect to the light quantity of the lens. Thus, the peripheral light quantity of the lens further degrades by the shading characteristics of the imaging element 220.

Figure 19:
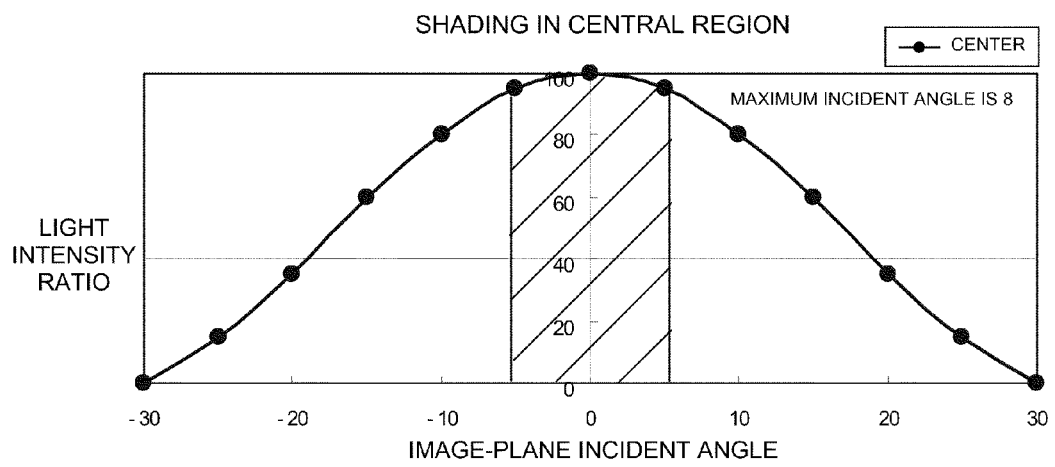
FIG. 19 illustrates an exemplary diagram illustrating the characteristics obtained by the optical system including an aberration controller according to an embodiment of the invention.

FIG. 19 is a view showing an example of the shading characteristics of the aberration control optical system 210. In FIG. 19, the area surrounded by the shaded lines shows the angle characteristics in which Fno is about 3.5. If is found that the aberration control optical system has small degradation amount as the absolute value of the maximum incident angle is small with respect to the conventional optical system.

Figure 20:
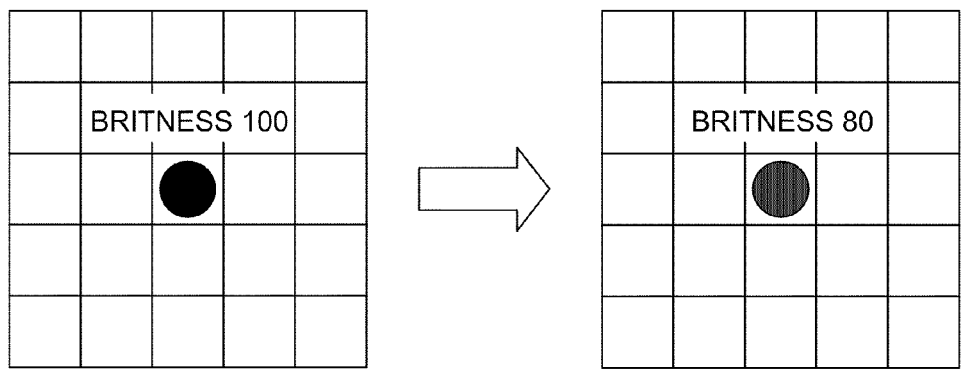
FIG. 20 illustrates a view showing a calculation example of the shading efficiency in the case where the normal optical system is applied.
Figure 21:
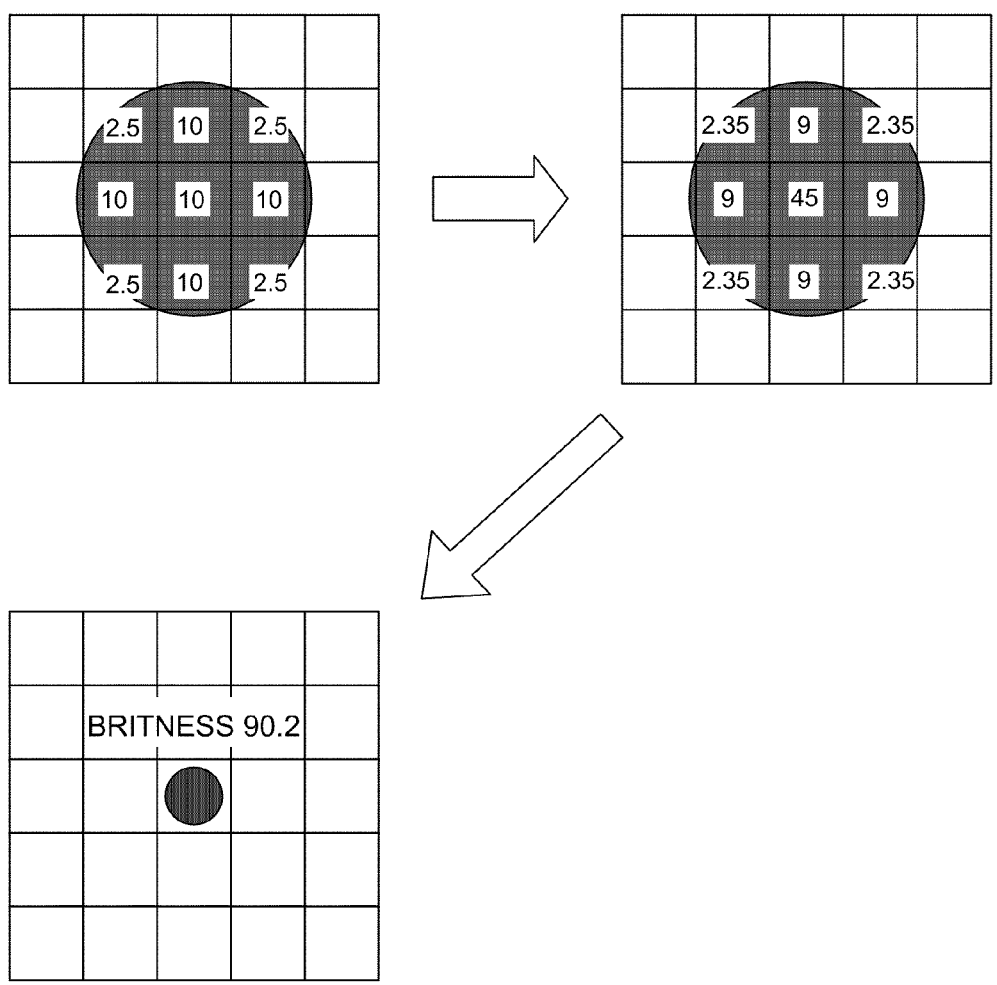
FIG. 21 illustrates a view showing a calculation example of the shading efficiency according to an embodiment of the invention.

FIG. 20 is a view showing a calculation example of the shading efficiency in the case where the normal optical system is applied. FIG. 21 is a view showing a calculation example of the shading efficiency according to an embodiment of the invention.

In the embodiment shown in FIG. 20, the integral value surrounded by the maximum incident angle of the numerical aperture (NA) light beam in FIG. 17 becomes the light quantity by the influence of the sensor shading if the signal of brightness about 100 reached the sensor, for example. The degradation amount increases as the NA becomes larger. Ideally, the efficiency of about 100% is the most satisfactory regardless of the light beam incident angle, but the brightness of about 80% is obtained in the normal optical system as in FIG. 20.

In the embodiment shown in FIG. 21, the light beam that passed the aberration control element can alleviate the light beam incident angle (NA) even if the Fno is the same compared to the normal optical system. However, as the PSF also spreads, it needs to be returned to one point through image processing. Returning the PSF to one point is the same as integrating the brightness, and thus compared to a case of collecting the light at one point with the lens as in the normal case, the degradation by shading is small, and a satisfactory efficiency results with regards to sensitivity. In the example embodiment shown in FIG. 21, the brightness of about 90.2% is obtained.

As described above, the image processing device 240 receives the first image FIM from the imaging element 220 and the process of returning the PSF diffused by the aberration control unit 213 to one point through image processing such as a process of integrating the brightness of the pixels over which the PSF is crossed is performed.

The image processing device 240 also performs image processing process, without limitation, including edge emphasis and the like such as MTF correction process and the like. Then the image processing device 240 performs a process to improve the contrast which has low value caused by the aberration control optical system 201A. Accordingly, a final high-definition image FNLIM can be controlled.

Figure 22:
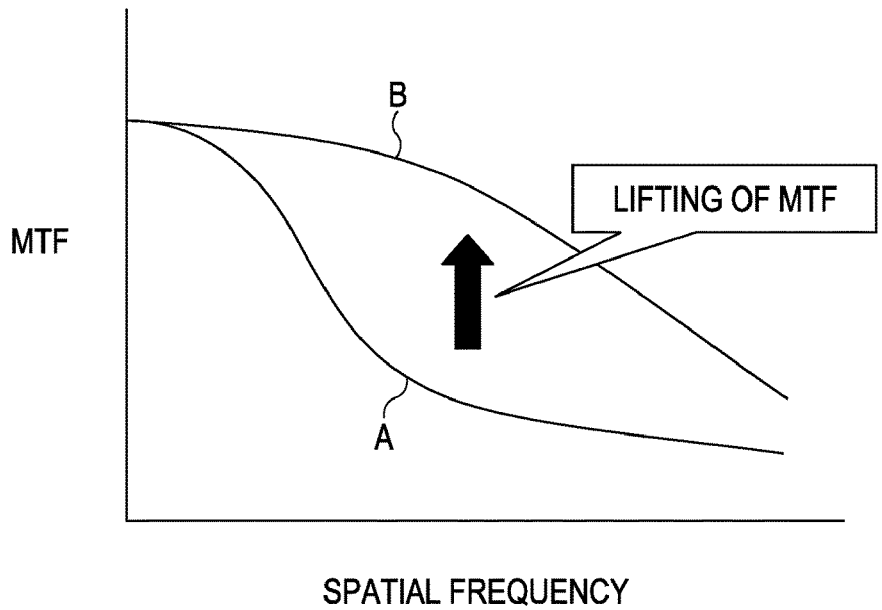
FIG. 22 illustrates an exemplary diagram for explaining an modulation transfer function (MTF) correction process performed by an image processing device according to an embodiment of the invention.

FIG. 22 is an exemplary diagram illustrating an MTF correction process performed by image processing device 240 according to an embodiment of the invention. In the MTF correction process performed by the image processing device 240, the MTF of the first image, which is low as shown by the curve A in FIG. 22, is changed to an MTF closer to, or the same as, that shown by the curve B in FIG. 22 by performing post-processing. The post-processing, may include, without limitation, including edge emphasis, chroma emphasis and the like using the spatial frequency as a parameter. The characteristic shown by the curve B in FIG. 22 is obtained when, for example, the wavefront shape is not changed without using the aberration controller such as an aberration control surface and an aberration control element in the present embodiment. In the present embodiment, the corrections are performed using the spatial frequency as a parameter.

Figure 23:
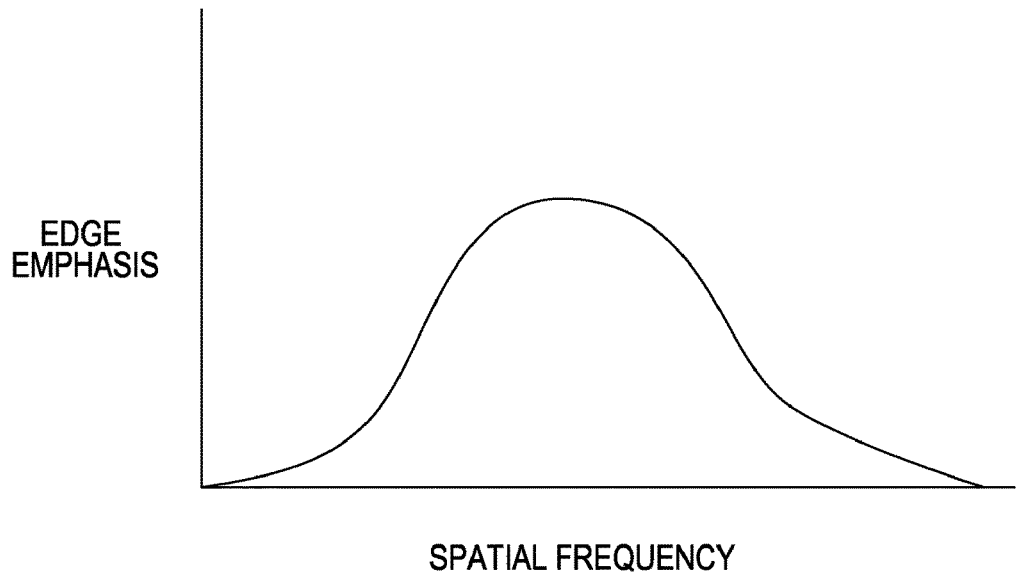
FIG. 23 illustrates an exemplary diagram for specifically explaining the MTF correction process performed by the image processing device according to an embodiment of the invention.

According to an embodiment, in order to obtain the final MTF characteristic curve B from the optically obtained MTF characteristic curve A with respect to the special frequency as shown in FIG. 22, the original image (first image) is corrected by performing edge emphasis or the like for each spatial frequency as shown in FIG. 23. For example, the MTF characteristic shown in FIG. 22 is processed with an edge emphasis curve with respect to the spatial frequency shown in FIG. 23.

More specifically, in a predetermined spatial frequency range, the degree of edge emphasis is reduced at a low-frequency side and a high-frequency side and is increased in an intermediate frequency region. Accordingly, the desired MTF characteristic curve B can be virtually obtained.

An MTF response of the present embodiment and that of a typical optical system are discussed below.

Figure 24:
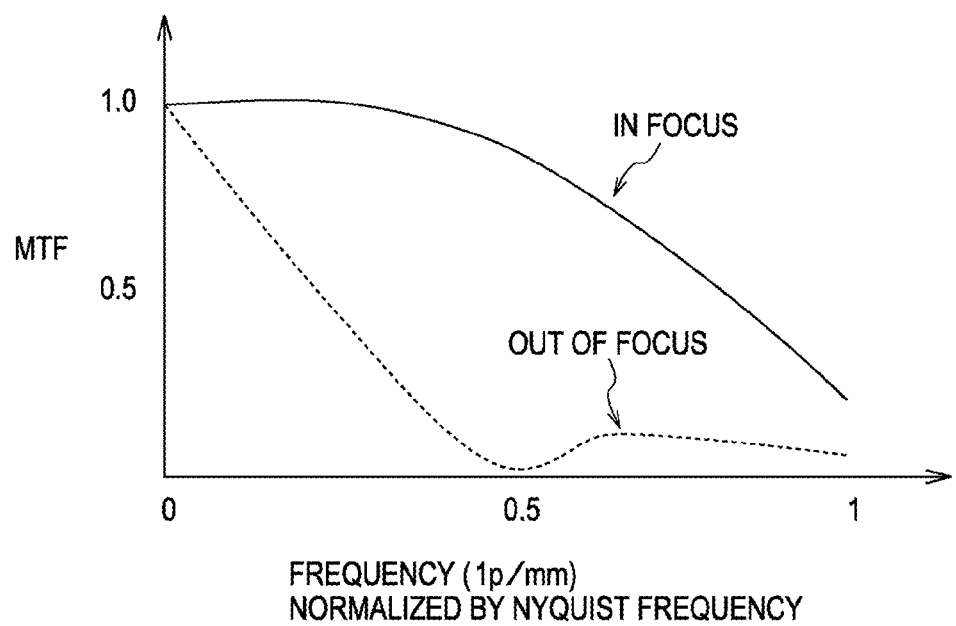
FIG. 24 illustrates an exemplary diagram illustrating the MTF response obtained when an object is in focus and when the object is out of focus in the typical optical system.
Figure 25:
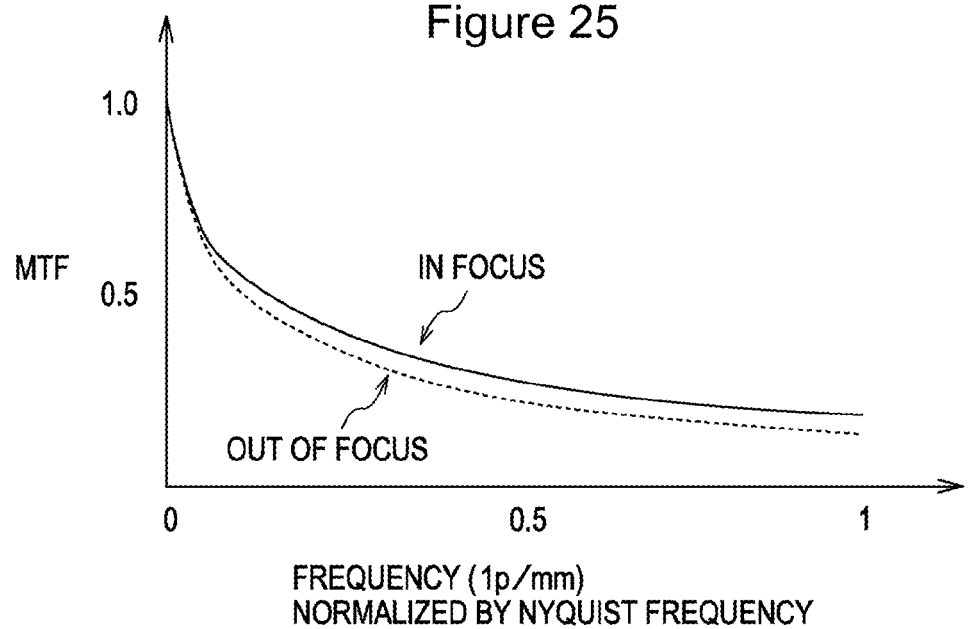
FIG. 25 illustrates an exemplary diagram illustrating the MTF response obtained when an object is in focus and when the object is out of focus in an optical system including the aberration controller according to an embodiment of the invention.

FIG. 24 is an exemplary diagram illustrating the MTF response obtained when an object is in focus and when the object is out of focus in the typical optical system. FIG. 25 is an exemplary diagram illustrating the MTF response obtained when an object is in focus and when the object is out of focus in an optical system including the aberration control optical system 210 according to an embodiment of the invention. FIG. 26 is an exemplary diagram illustrating the MTF response obtained after image processing process in the image pickup apparatus according to an embodiment of the invention.

As shown in FIGS. 24-26, in the aberration control optical system 210 including the aberration-controller (i.e., the aberration controlling surface or the aberration controlling element), variation in the MTF response obtained when the object is out of focus is smaller than that in an optical system free from the aberration-controller. The MTF response in FIGS. 24-26 can be increased by subjecting the image formed by the optical system including the aberration-controller to an image processing using the image processor 240.

However, if the noise increases when the image processing is performed, the image processing that may enhance the response of the MTF may not be suitably performed.

The OTF (MTF) value for the optical system including an aberration-controller is preferably about 0.1 or more at the Nyquist frequency shown in FIG. 25. The reason for this is described below. In order to obtain the OTF shown in FIG. 26 after image processing, the gain is increased by the image processing. However, the sensor noise is also increased. Therefore, preferably, the image processing is performed without largely increasing the gain in a high-frequency range around the Nyquist frequency. In an optical system, sufficient resolution can be obtained if the MTF value at the Nyquist frequency is about 0.1 or more. Therefore, if the MTF value is at least about 0.1 before image processing, it is not necessary to increase the gain at the Nyquist frequency by image processing. If the MTF value is less than about 0.1 before image processing, the image after image processing is largely influenced by noise. That is not preferable.

The spherical aberration is described in the present embodiment, but other aberration may be applied. For example, but without limitation, astigmatism, coma aberration, and distortion aberration may be applied.

As explained above, the aberration control optical system 210 for intentionally controlling aberration comprises an imaging element 220 and an image processing device 240 for forming a final high-definition image from the first image. The aberration control optical system 210 comprises an aberration controller which intentionally controls an aberration, such as an aberration-controlling element or aberration-controlling optical surface.

Through the use of the aberration control optical system 210, the angle formed by the light beam passed through the aberration control optical system 210 and the optical axis is small compared to the angle formed by the light beam from the outermost peripheral part of the lens defining the image side numerical aperture of the aberration control optical system 210 without the aberration control function (unit) and the optical axis, the degradation of light quantity by shading is alleviated, and the diffused PSF is formed as a depth expansion optical system restored through image processing.

Thus, in the present embodiment, the degradation of light quantity by shading can be alleviated by controlling the sensor incident angle of the light beam using the aberration control function. As a result, the light quantity entering each pixel can be efficiently obtained and the sensitivity can be enhanced, and furthermore, occurrence of shading can be significantly suppressed.

In the present embodiment, the image quality can be enhanced through enhancement of the sensitivity without using a highly difficult, expensive and large optical lens. Furthermore, although the light beam incident angle to the imaging element 220 becomes smaller, the smaller the electronic device, a more satisfactory image quality can be obtained while suppressing the light beam incident angle. Moreover, a natural image can be obtained without driving the lens. According to the present embodiments, the structure of the optical system is simplified and the cost is reduced. In other words, since the light beam is not collected at one point as in the conventional optical system, tolerance of parts and requested tolerance in time of assembly are not required compared to a case of collecting the light at one point, whereby worsening of yield, increase in cost, and complication of assembly step can be avoided.

Therefore, the imaging device 200 can be applied to a compact, light weight, and low cost commercial off-the-shelf device.

Such electronic devices may be, without limitation, a digital still camera, a mobile phone camera, a Personal Digital Assistant (PDA) camera, a camera used for a vehicle, an image inspection apparatus, an industrial camera used for automatic control, and the like.

While at least one exemplary embodiment has been presented in the foregoing detailed description, the present invention is not limited to the above-described embodiment or embodiments. Variations may be apparent to those skilled in the art. In carrying out the present invention, various modifications, combinations, sub-combinations and alterations may occur in regard to the elements of the above-described embodiment insofar as they are within the technical scope of the present invention or the equivalents thereof. The exemplary embodiment or exemplary embodiments are examples, and are not intended to limit the scope, applicability, or configuration of the invention in any way. Rather, the foregoing detailed description will provide those skilled in the art with a template for implementing the exemplary embodiment or exemplary embodiments. It should be understood that various changes can be made in the function and arrangement of elements without departing from the scope of the invention as set forth in the appended claims and the legal equivalents thereof. Furthermore, although embodiments of the present invention have been described with reference to the accompanying drawings, it is to be noted that changes and modifications may be apparent to those skilled in the art. Such changes and modifications are to be understood as being included within the scope of the present invention as defined by the claims.

Terms and phrases used in this document, and variations thereof, unless otherwise expressly stated, should be construed as open ended as opposed to limiting. As examples of the foregoing: the term "including" should be read as mean "including, without limitation" or the like; the term "example" is used to provide exemplary instances of the item in discussion, not an exhaustive or limiting list thereof; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the invention may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent. The term "about" when referring to a numerical value or range is intended to encompass values resulting from experimental error that can occur when taking measurements.

The invention claimed is:

1. An imaging device comprising:
    an aberration control optical system comprising a lens and an aberration control unit for causing aberration; and
    an imaging element operable for imaging a subject image passed through the aberration control optical system,
    wherein a first angle formed by an optical axis and a light beam passed through the aberration control optical system is smaller than a second angle formed by the optical axis and a light beam from an outermost peripheral part of the lens defining an image side numerical aperture of the aberration control optical system without the aberration control unit, wherein $1/(2*\sin Um)>1/(2*\sin K)$ is satisfied and where Um is a maximum of angles formed by the light beam, and K is an angle formed by a limit incident light beam at which the imaging element tolerates an influence of shading and the optical axis.

2. The imaging device according to claim 1, wherein the aberration control unit comprises an aberration control element.

3. The imaging device according to claim 2, wherein the aberration control element comprises an aperture function.

4. The imaging device according to claim 2, wherein the aberration control element comprises at least one of the group consisting of: a liquid lens and a liquid crystal lens.

5. The imaging device according to claim 1, wherein the aberration control unit comprises an aberration control surface.

6. The imaging device according to claim 1, wherein the aberration is at least a spherical aberration on positive side, and a maximum incident angle of the light beam to a light receiving surface of the imaging element is closer to perpendicular compared to a state in which the aberration does not occur.

7. The imaging device according to claim 6, further comprising an image processing unit operable to perform image processing on an image signal obtained by the imaging element, wherein the image processing unit is operable to perform a recovery process of a point image intensity distribution (PSF).

8. The imaging device according to claim 1, wherein a point image intensity distribution (PSF) of an image formed at a light receiving surface of the imaging element crosses two or more pixels of the imaging element.

9. The imaging device according to claim 1, wherein the aberration control optical system comprises an aperture near the aberration control unit.

10. An imaging method comprising:
    receiving a light in a lens system;
    causing aberration to the light to obtain an aberated light;
    controlling an incident angle of the light entering an imaging element to be smaller than an incident angle of an optical system that does not cause the aberration;
    imaging the aberated light on a light receiving surface of the imaging element to obtain a one-dimensional image where a point image intensity distribution (PSF) is diffused; and
    performing image processing for restoring the PSF of the one-dimensional image to one pixel, wherein $1/(2*\sin Um)>1/(2*\sin K)$ is satisfied and where Um is a maximum of angles formed by a light beam, and K is an angle formed by a limit incident light beam at which the imaging element tolerates an influence of shading and the optical axis.

11. The imaging method according to claim 10, wherein the aberration is caused by an aberration control unit comprising an aberration control element.

12. The imaging method according to claim 11, wherein the aberration control element comprises an aperture function.

13. The imaging method according to claim 11, wherein the aberration control element comprises at least one of the group consisting of: a liquid lens and a liquid crystal lens.

14. The imaging method according to claim 11, wherein the aberration control unit comprises an aberration control surface.

15. The imaging method according to claim 11, wherein the aberration is at least a spherical aberration on positive side, and a maximum incident angle of a light beam to a light receiving surface of the imaging element is closer to perpendicular compared to a state in which aberration does not occur.

16. The imaging method according to claim 15, further comprising performing image processing using an image processing unit on an image signal obtained by the imaging element, wherein the image processing unit performs a recovery process of a point image intensity distribution (PSF).

17. The imaging method according to claim 16, wherein the point image intensity distribution (PSF) of an image formed at the light receiving surface of the imaging element crosses two or more pixels of the imaging element.

* * * * *